(12) United States Patent
Luo et al.

(10) Patent No.: US 9,813,205 B2
(45) Date of Patent: Nov. 7, 2017

(54) UPLINK COMP SET SELECTING METHOD AND SYSTEM, AND DEVICE

(71) Applicant: HUAWEI TECHNOLOGIES CO., LTD., Shenzhen (CN)

(72) Inventors: Haiyan Luo, Shanghai (CN); Tianle Deng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 207 days.

(21) Appl. No.: 14/739,377

(22) Filed: Jun. 15, 2015

(65) Prior Publication Data

US 2015/0280873 A1    Oct. 1, 2015

Related U.S. Application Data

(63) Continuation of application No. PCT/CN2012/086702, filed on Dec. 14, 2012.

(51) Int. Cl.
*H04L 5/00* (2006.01)
*H04B 7/022* (2017.01)
(Continued)

(52) U.S. Cl.
CPC ........... *H04L 5/0035* (2013.01); *H04B 7/022* (2013.01); *H04B 7/0619* (2013.01);
(Continued)

(58) Field of Classification Search
CPC ..... H04L 5/0035; H04L 5/005; H04L 5/0094; H04L 5/0048; H04B 7/0619; H04B 7/022; H04W 72/0406; H04W 48/20
See application file for complete search history.

(56) References Cited

U.S. PATENT DOCUMENTS 9,148,818 B2 *   9/2015   Yue .................... H04L 5/001
2010/0304682 A1 *  12/2010   Choi .................. H04B 7/024
                                                         455/63.1
(Continued)

FOREIGN PATENT DOCUMENTS

CN    102316510      1/2012
CN    102474401      5/2012
EP    2 590 450 A1   5/2013

OTHER PUBLICATIONS

PCT International Search Report dated Sep. 19, 2013 in corresponding International Patent Application No. PCT/CN2012/086702.
(Continued)

*Primary Examiner* — Ajay Cattungal
(74) *Attorney, Agent, or Firm* — Staas & Halsey LLP

(57) ABSTRACT

Embodiments of the present application provide an uplink coordinated multipoint transmission (CoMP) set selecting method and system, and a device, which relate to the communications field, so that an uplink CoMP set of a cell or of user equipment (UE) served by a cell can be determined by means of exchange, between base stations, of at least channel state information-reference signal (CSI-RS) configuration information used for distinguishing cells. Technical solutions provided by the embodiments of the present application can implement sharing of control information and data information among multiple cells in a wireless communications system.

16 Claims, 7 Drawing Sheets

(51) Int. Cl.
*H04B 7/06* (2006.01)
*H04W 48/20* (2009.01)
*H04W 72/04* (2009.01)

(52) U.S. Cl.
CPC ........... *H04L 5/0048* (2013.01); *H04W 48/20* (2013.01); *H04W 72/0406* (2013.01); *H04L 5/005* (2013.01); *H04L 5/0094* (2013.01)

(56) References Cited

U.S. PATENT DOCUMENTS

| | | | | |
|---|---|---|---|---|
| 2011/0170516 A1* | 7/2011 | Hu | ................... | H04W 36/0033 |
| | | | | 370/331 |
| 2011/0199986 A1 | 8/2011 | Fong et al. | | |
| 2011/0281585 A1* | 11/2011 | Kwon | ................... | H04L 1/0002 |
| | | | | 455/436 |
| 2012/0113950 A1 | 5/2012 | Skov et al. | | |
| 2012/0135771 A1* | 5/2012 | Futaki | ................... | H04B 7/024 |
| | | | | 455/509 |
| 2012/0177090 A1* | 7/2012 | Iwai | ....................... | H04B 7/024 |
| | | | | 375/219 |
| 2012/0188950 A1* | 7/2012 | Luo | ....................... | H04L 5/0035 |
| | | | | 370/329 |
| 2013/0077513 A1* | 3/2013 | Ng | ......................... | H04B 7/024 |
| | | | | 370/252 |
| 2014/0044061 A1* | 2/2014 | Yue | ..................... | H04W 72/042 |
| | | | | 370/329 |
| 2014/0133333 A1* | 5/2014 | Liu | ....................... | H04W 24/10 |
| | | | | 370/252 |
| 2014/0328307 A1* | 11/2014 | Takano | .................. | H04W 48/18 |
| | | | | 370/329 |
| 2015/0156657 A1* | 6/2015 | Ji | ........................... | H04B 7/024 |
| | | | | 370/228 |

OTHER PUBLICATIONS

Huawei, HiSilicon, "Management of CoMP Measurement Set", 3GPP TSG RAN WG1 meeting #68, Dresden, Germany, Feb. 2012, 3 pp.

Huawei, HiSilicon, "Configuration of CSI-RS for CoMP", 3GPP TSG RAN WG1 Meeting #67, San Francisco, USA, Nov. 2011, 2 pp.

"3rd Generation Partnership Project; Technical Specification Group Radio Access Network; Coordinated multi-point operation for LTE physical layer aspects (Release 11)", 3GPP TR 36.819, V11.1.0, Dec. 2011, pp. 1-69.

International Search Report dated Sep. 19, 2013 in corresponding international application PCT/CN2012/086702.

Extended European Search Report dated Nov. 5, 2015 in corresponding European Patent Application No. 12889903.6.

"Point Selection and CSI Feedback for CoMP Operation", 3GPP TSG-RAN WG1 #66bis, R1-113051, Zhuhai, China, Oct. 10-14, 2011, 4 pp.

"CoMP resource management and CoMP measurement set", 3GPP TSG-RAN WG2 Meeting #78, R2-122172, May 21-25, 2012, Prague, Czech Republic, 2 pp.

* cited by examiner

UPLINK COMP SET SELECTING METHOD AND SYSTEM, AND DEVICE

CROSS-REFERENCE TO RELATED APPLICATIONS

This application is a continuation of International Application No. PCT/CN2012/086702, filed on Dec. 14, 2012, which is hereby incorporated by reference in its entirety.

TECHNICAL FIELD

The present invention relates to the communications field, and in particular, to an uplink CoMP set selecting method and system, and a device.

BACKGROUND

Coordinated multipoint transmission (CoMP for short) refers to that multiple geographically separated transmission points participate in data transmission for a user equipment (UE for short) in a coordinated manner or jointly receive data sent by a UE. CoMP can implement sharing of control information and data information among multiple cells in a wireless communications system, which can effectively improve overall cell performance and cell edge user performance.

An uplink joint processing technology in an uplink CoMP scenario refers to that: some or all of cells in a CoMP set receive uplink data sent on a physical uplink shared channel (PUSCH for short) by UE, and jointly make a decision in a coordinated manner, thereby improving receiving quality of an uplink signal. Therefore, how a CoMP set is determined becomes more important.

SUMMARY

Embodiments of the present invention provide an uplink CoMP set selecting method and system, and a device, so that an uplink CoMP set of a cell or of UE served by a cell can be determined by means of exchange, between base stations, of at least CSI-RS configuration information used for distinguishing cells.

To achieve the foregoing objective, the embodiments of the present invention use the following technical solutions:

According to a first aspect, an embodiment of the present invention provides an uplink CoMP set selecting method, including:

receiving, by a first base station, a first message sent by a second base station, where the first message carries configuration information corresponding to a channel state information-reference signal (CSI-RS for short) of each cell of at least one second cell; and selecting, by the first base station according to at least the first message, a cell of the at least one second cell to add to an uplink CoMP set of first user equipment UE served by a first cell, where:

the at least one second cell is a cell of the second base station, and the cell of the at least one second cell is determined by a physical cell identifier (PCI for short) and the CSI-RS; the first cell is a cell of the first base station.

In a first possible implementation manner of the first aspect, the selecting, by the first base station according to at least the first message, a cell of the at least one second cell to add to an uplink CoMP set of first UE served by a first cell includes:

sending, by the first base station to the first UE, the configuration information corresponding to the CSI-RS of each of the at least one second cell;

receiving, by the first base station, receive power information that is obtained through measurement by the first UE according to the configuration information and that is corresponding to the CSI-RS of the cell of the at least one second cell; and selecting, by the first base station according to at least the receive power information, the cell of the at least one second cell to add to the uplink CoMP set of the first UE.

In a second possible implementation manner of the first aspect, the selecting, by the first base station according to at least the first message, a cell of the at least one second cell to add to an uplink CoMP set of first UE served by a first cell includes:

sending, by the first base station to the first UE, the configuration information corresponding to the CSI-RS of each of the at least one second cell;

receiving, by the first base station, receive power information that is obtained through measurement by the first UE according to the configuration information and that is corresponding to the CSI-RS of the cell of the at least one second cell;

when the first message further carries transmit power information corresponding to the CSI-RS of each of the at least one second cell, determining, by the first base station, a path loss from the first UE to the cell of the at least one second cell according to the transmit power information corresponding to the CSI-RS of each of the at least one second cell and the receive power information that is obtained through measurement by the first UE and that is corresponding to the CSI-RS of the cell of the at least one second cell; and selecting, by the first base station according to at least the path loss from the first UE to the cell of the at least one second cell, the cell of the at least one second cell to add to the uplink CoMP set of the first UE.

With reference to the second possible implementation manner of the first aspect, in a third possible implementation manner, the selecting, by the first base station according to at least the path loss from the first UE to the cell of the at least one second cell, the cell of the at least one second cell to add to the uplink CoMP set of the first UE includes:

sending, by the first base station to the second base station, transmit power information corresponding to a CSI-RS of the first cell and configuration information corresponding to the CSI-RS of the first cell, where the first cell is determined by a PCI and the CSI-RS;

receiving, by the first base station, a normalized path loss from the at least one second cell to the first cell sent by the second base station, where the normalized path loss from the at least one second cell to the first cell is determined by the second base station according to at least the transmit power information corresponding to the CSI-RS of the first cell and the configuration information corresponding to the CSI-RS of the first cell; and selecting, by the first base station according to at least the path loss from the first UE to the cell of the at least one second cell and the normalized path loss from the at least one second cell to the first cell, the cell of the at least one second cell to add to the uplink CoMP set of the first UE.

According to a second aspect, an embodiment of the present invention provides an uplink CoMP set selecting method, including:

receiving, by a first base station, a first message sent by a second base station, where the first message carries configuration information corresponding to a CSI-RS of each cell of at least one second cell; and selecting, by the first base station according to at least the first message, a cell of the at least one second cell to add to an uplink CoMP set of a first cell, where:

the at least one second cell is a cell of the second base station, and the cell of the at least one second cell is determined by a PCI and the CSI-RS; the first cell is a cell of the first base station.

In a first possible implementation manner of the second aspect, the selecting, by the first base station according to at least the first message, a cell of the at least one second cell to add to an uplink CoMP set of a first cell includes:

sending, by the first base station to multiple first UEs served by the first cell, the configuration information corresponding to the CSI-RS of each of the at least one second cell.

receiving, by the first base station, receive power information that is obtained through measurement by multiple first UEs according to the configuration information and that is corresponding to the CSI-RS of the cell of the at least one second cell; and determining, by the first base station, average receive power from the first cell to the cell of the at least one second cell according to at least the receive power information, and selecting, according to at least the average receive power, the cell of the at least one second cell to add to the uplink CoMP set of the first cell.

In a second possible implementation manner of the second aspect, the selecting, by the first base station according to at least the first message, a cell of the at least one second cell to add to an uplink CoMP set of a first cell includes:

sending, by the first base station to the multiple first UEs, the configuration information corresponding to the CSI-RS of each of the at least one second cell;

receiving, by the first base station, receive power information that is obtained through measurement by the multiple first UEs according to the configuration information and that is corresponding to the CSI-RS of the cell of the at least one second cell;

when the first message further carries transmit power information corresponding to the CSI-RS of each of the at least one second cell, determining, by the first base station, a normalized path loss from the first cell to the cell of the at least one second cell according to the transmit power information corresponding to the CSI-RS of each of the at least one second cell and the receive power information that is obtained through measurement by the multiple first UEs and that is corresponding to the CSI-RS of the cell of the at least one second cell; and selecting, by the first base station according to at least the normalized path loss from the first cell to the cell of the at least one second cell, the cell of the at least one second cell to add to the uplink CoMP set of the first cell.

With reference to the second possible implementation manner of the second aspect, in a third possible implementation manner, the selecting, by the first base station according to at least the normalized path loss from the first cell to the cell of the at least one second cell, the cell of the at least one second cell to add to the uplink CoMP set of the first cell includes:

sending, by the first base station to the second base station, transmit power information corresponding to a CSI-RS of the first cell and configuration information corresponding to the CSI-RS of the first cell, where the first cell is determined by a PCI and the CSI-RS;

receiving, by the first base station, a normalized path loss from the at least one second cell to the first cell sent by the second base station, where the normalized path loss from the at least one second cell to the first cell is determined by the second base station according to at least the transmit power information corresponding to the CSI-RS of the first cell and the configuration information corresponding to the CSI-RS of the first cell; and selecting, by the first base station according to the normalized path loss from the first cell to the cell of the at least one second cell and the normalized path loss from the at least one second cell to the first cell, the cell of the at least one second cell to add to the uplink CoMP set of the first cell.

According to a third aspect, an embodiment of the present invention provides an uplink CoMP set selecting method, including: sending, by a first base station to a second base station, transmit power information corresponding to a CSI-RS of a first cell and configuration information corresponding to the CSI-RS of the first cell, where the first cell is a cell of the first base station, and the first cell is determined by a PCI and the CSI-RS;

receiving, by the first base station, a normalized path loss from at least one second cell to the first cell sent by the second base station, where the normalized path loss from the at least one second cell to the first cell is determined by the second base station according to at least the transmit power information corresponding to the CSI-RS of the first cell and the configuration information corresponding to the CSI-RS of the first cell; the at least one second cell is a cell of the second base station, and a cell of the at least one second cell is determined by a PCI and the CSI-RS; and selecting, by the first base station according to at least the normalized path loss from the at least one second cell to the first cell, a cell of the at least one second cell to add to an uplink CoMP set of the first cell.

According to a fourth aspect, an embodiment of the present invention provides a base station, including:

a receiving unit, configured to receive a first message sent by a second base station, where the first message carries configuration information corresponding to a CSI-RS of each cell of at least one second cell; the at least one second cell is a cell of the second base station, and a cell of the at least one second cell is determined by a PCI and the CSI-RS; and a processing unit, configured to select, according to at least the first message received by the receiving unit, a cell of the at least one second cell to add to an uplink CoMP set of first user equipment UE served by a first cell, where the first cell is a cell of the base station.

In a first possible implementation manner of the fourth aspect, the base station further includes a sending unit, configured to send, to the first UE, the configuration information corresponding to the CSI-RS of each of the at least one second cell, where:

the receiving unit is further configured to receive power information that is obtained through measurement by the first UE according to the configuration information and that is corresponding to the CSI-RS of the cell of the at least one second cell; and the processing unit is specifically configured to: instruct the sending unit to send, to the first UE, the configuration information corresponding to the CSI-RS of the cell of the at least one second cell; and select, according to at least the receive power information received by the receiving unit, the cell of the at least one second cell to add to the uplink CoMP set of the first UE.

In a second possible implementation manner of the fourth aspect, the base station further includes a sending unit, configured to send, to the first UE, the configuration information corresponding to the CSI-RS of each of the at least one second cell, where:

the receiving unit is further configured to receive power information that is obtained through measurement by the first UE according to the configuration information and that is corresponding to the CSI-RS of the cell of the at least one second cell; and the processing unit is specifically configured to instruct the sending unit to send, to the first UE, the configuration information corresponding to the CSI-RS of each of the at least one second cell; when the first message received by the receiving unit further carries transmit power information corresponding to the CSI-RS of each of the at least one second cell, the processing unit is further specifically configured to: determine a path loss from the first UE to the cell of the at least one second cell according to the transmit power information corresponding to the CSI-RS of each of the at least one second cell and the receive power information that is obtained through measurement by the first UE and that is corresponding to the CSI-RS of the cell of the at least one second cell; and select, according to at least the path loss from the first UE to the cell of the at least one second cell, the cell of the at least one second cell to add to the uplink CoMP set of the first UE.

With reference to the second possible implementation manner of the fourth aspect, in a third possible implementation manner, the sending unit is further configured to send, to the second base station, transmit power information corresponding to a CSI-RS of the first cell and configuration information corresponding to the CSI-RS of the first cell, where the first cell is determined by a PCI and the CSI-RS;

the receiving unit is further configured to receive a normalized path loss from the at least one second cell to the first cell sent by the second base station, where the normalized path loss from the at least one second cell to the first cell is determined by the second base station according to at least the transmit power information corresponding to the CSI-RS of the first cell and the configuration information corresponding to the CSI-RS of the first cell; and the processing unit is specifically configured to instruct the sending unit to send, to the second base station, the transmit power information corresponding to the CSI-RS of the first cell and the configuration information corresponding to the CSI-RS of the first cell; when the first message received by the receiving unit further carries the transmit power information corresponding to the CSI-RS of each of the at least one second cell, the processing unit is further specifically configured to: determine a path loss from the first UE to the cell of the at least one second cell according to the transmit power information corresponding to the CSI-RS of each of the at least one second cell and the receive power information that is obtained through measurement by the first UE and that is corresponding to the CSI-RS of the cell of the at least one second cell; and select, according to at least the path loss from the first UE to the cell of the at least one second cell and the normalized path loss from the at least one second cell to the first cell, the cell of the at least one second cell to add to the uplink CoMP set of the first UE.

According to a fifth aspect, an embodiment of the present invention provides a base station, including:

a receiving unit, configured to receive a first message sent by a second base station, where the first message carries configuration information corresponding to a CSI-RS of each cell of at least one second cell; the at least one second cell is a cell of the second base station, and a cell of the at least one second cell is determined by a PCI and the CSI-RS; and a processing unit, configured to select, according to at least the first message received by the receiving unit, a cell of the at least one second cell to add to an uplink CoMP set of a first cell, where the first cell is a cell of the base station.

In a first possible implementation manner of the fifth aspect, the base station further includes a sending unit, configured to send, to multiple first user equipments UE served by the first cell, the configuration information corresponding to the CSI-RS of each of the at least one second cell, where:

the receiving unit is further configured to receive power information that is obtained through measurement by the multiple first UEs according to the configuration information and that is corresponding to the CSI-RS of the cell of the at least one second cell; and the processing unit is specifically configured to instruct the sending unit to send, to the multiple first UEs, the configuration information corresponding to the CSI-RS of each of the at least one second cell; the processing unit is further specifically configured to: determine average receive power from the first cell to the cell of the at least one second cell according to at least the receive power information received by the receiving unit; and select, according to the average receive power, the cell of the at least one second cell to add to the uplink CoMP set of the first cell.

In a second possible implementation manner of the fifth aspect, the base station further includes a sending unit, configured to send, to the multiple first UEs, the configuration information corresponding to the CSI-RS of each of the at least one second cell, where:

the receiving unit is further configured to receive power information that is obtained through measurement by the multiple first UEs according to the configuration information and that is corresponding to the CSI-RS of the cell of the at least one second cell; and the processing unit is specifically configured to instruct the sending unit to send, to the multiple first UEs, the configuration information corresponding to the CSI-RS of each of the at least one second cell; when the first message received by the receiving unit further carries transmit power information corresponding to the CSI-RS of each of the at least one second cell, the processing unit is further specifically configured to: determine a normalized path loss from the first cell to the cell of the at least one second cell according to the transmit power information corresponding to the CSI-RS of each of the at least one second cell and the receive power information that is obtained through measurement by the multiple first UEs and that is corresponding to the CSI-RS of the cell of the at least one second cell; and select, according to at least the normalized path loss from the first cell to the cell of the at least one second cell, the cell of the at least one second cell to add to the uplink CoMP set of the first cell.

With reference to the second possible implementation manner of the fifth aspect, in a third possible implementation manner, the sending unit is further configured to send, to the second base station, transmit power information corresponding to a CSI-RS of the first cell and configuration information corresponding to the CSI-RS of the first cell, where the first cell is determined by a PCI and the CSI-RS;

the receiving unit is further configured to receive a normalized path loss from the at least one second cell to the first cell sent by the second base station, where the normalized path loss from the at least one second cell to the first cell is determined by the second base station according to at least the transmit power information corresponding to the CSI-RS of the first cell and the configuration information corresponding to the CSI-RS of the first cell; and the processing unit is specifically configured to: when the first message received by the receiving unit further carries the transmit power information corresponding to the CSI-RS of each of the at least one second cell, determine a normalized path loss from the first cell to the cell of the at least one second cell according to the transmit power information corresponding to the CSI-RS of each of the at least one second cell and the receive power information that is obtained through measurement by the multiple first UEs and that is corresponding to the CSI-RS of the cell of the at least one second cell; and select, according to the normalized path loss from the first cell to the cell of the at least one second cell and the normalized path loss from the at least one second cell to the first cell, the cell of the at least one second cell to add to the uplink CoMP set of the first cell.

According to a sixth aspect, an embodiment of the present invention provides a base station, including: a sending unit, configured to send, to a second base station, transmit power information corresponding to a channel state information-reference signal CSI-RS of a first cell and configuration information corresponding to the CSI-RS of the first cell, where the first cell is a cell of the base station, and the first cell is determined by a physical cell identifier PCI and the CSI-RS;

a receiving unit, configured to receive a normalized path loss from at least one second cell to the first cell sent by the second base station, where the normalized path loss from the at least one second cell to the first cell is determined by the second base station according to at least the transmit power information corresponding to the CSI-RS of the first cell and the configuration information corresponding to the CSI-RS of the first cell; the at least one second cell is a cell of the second base station, and a cell of the at least one second cell is determined by a PCI and the CSI-RS; and a processing unit, configured to instruct the sending unit to send, to the second base station, the transmit power information corresponding to the CSI-RS of the first cell and the configuration information corresponding to the CSI-RS of the first cell; and select, according to at least the normalized path loss from the at least one second cell to the first cell received by the receiving unit, a cell of the at least one second cell to add to an uplink coordinated multipoint transmission CoMP set of the first cell.

According to a seventh aspect, an embodiment of the present invention provides a base station, including a receiver, a memory, and a processor, where:

the receiver is configured to receive a first message sent by a second base station, where the first message carries configuration information corresponding to a CSI-RS of each cell of at least one second cell; the at least one second cell is a cell of the second base station, and a cell of the at least one second cell is determined by a PCI and the CSI-RS;

the memory is configured to store program code; and the processor is configured to execute the code, where the code includes: controlling, by the processor, the receiver to receive the first message; and selecting, by the processor according to at least the first message, a cell of the at least one second cell to add to an uplink coordinated multipoint transmission CoMP set of first user equipment UE served by a first cell, where the first cell is a cell of the base station.

In a first possible implementation manner of the seventh aspect, the base station further includes a transmitter, configured to send, to the first UE, the configuration information corresponding to the CSI-RS of each of the at least one second cell; and the selecting, by the processor according to at least the first message, a cell of the at least one second cell to add to an uplink CoMP set of first UE served by a first cell specifically includes:

controlling, by the processor, the transmitter to send, to the first UE, the configuration information corresponding to the CSI-RS of each of the at least one second cell; and when the receiver further receives receive power information that is obtained through measurement by the first UE according to the configuration information and that is corresponding to the CSI-RS of the cell of the at least one second cell, selecting, according to at least the receive power information, the cell of the at least one second cell to add to the uplink CoMP set of the first UE, where the receiver is further configured to receive the receive power information that is obtained through measurement by the first UE according to the configuration information and that is corresponding to the CSI-RS of the cell of the at least one second cell.

In a second possible implementation manner of the seventh aspect, the base station further includes a transmitter, configured to send, to the first UE, the configuration information corresponding to the CSI-RS of each of the at least one second cell; and the selecting, by the processor according to at least the first message, a cell of the at least one second cell to add to an uplink CoMP set of first UE served by a first cell specifically includes:

controlling the transmitter to send, to the first UE, the configuration information corresponding to the CSI-RS of each of the at least one second cell;

when the receiver further receives receive power information that is obtained through measurement by the first UE according to the configuration information and that is corresponding to the CSI-RS of the cell of the at least one second cell, and when the first message further carries transmit power information corresponding to the CSI-RS of each of the at least one second cell, determining a path loss from the first UE to the cell of the at least one second cell according to the transmit power information corresponding to the CSI-RS of each of the at least one second cell and the receive power information that is obtained through measurement by the first UE and that is corresponding to the CSI-RS of the cell of the at least one second cell, where the receiver is further configured to receive the receive power information that is obtained through measurement by the first UE according to the configuration information and that is corresponding to the CSI-RS of the cell of the at least one second cell; and selecting, according to at least the path loss from the first UE to the cell of the at least one second cell, the cell of the at least one second cell to add to the uplink CoMP set of the first UE.

With reference to the second possible implementation manner of the seventh aspect, in a third possible implementation manner, the selecting, by the processor according to at least the path loss from the first UE to the cell of the at least one second cell, the cell of the at least one second cell to add to the uplink CoMP set of the first UE specifically includes:

controlling the transmitter to send, to the second base station, transmit power information corresponding to a CSI-RS of the first cell and configuration information corresponding to the CSI-RS of the first cell; and when the receiver receives a normalized path loss from the at least one second cell to the first cell sent by the second base station, selecting, according to at least the path loss from the first UE to the cell of the at least one second cell and the normalized path loss from the at least one second cell to the first cell, the cell of the at least one second cell to add to the uplink CoMP set of the first UE, where:

the transmitter is further configured to send, to the second base station, the transmit power information corresponding to the CSI-RS of the first cell and the configuration information corresponding to the CSI-RS of the first cell, where the first cell is determined by a PCI and the CSI-RS; and the receiver is further configured to receive the normalized path loss from the at least one second cell to the first cell sent by the second base station, where the normalized path loss from the at least one second cell to the first cell is determined by the second base station according to at least the transmit power information corresponding to the CSI-RS of the first cell and the configuration information corresponding to the CSI-RS of the first cell.

According to an eighth aspect, an embodiment of the present invention provides a base station, including a receiver, a memory, and a processor, where:

the receiver is configured to receive a first message sent by a second base station, where the first message carries configuration information corresponding to a CSI-RS of each cell of at least one second cell; the at least one second cell is a cell of the second base station, and a cell of the at least one second cell is determined by a PCI and the CSI-RS;

the memory is configured to store program code; and the processor is configured to execute the code, where the code includes: controlling, by the processor, the receiver to receive the first message; and selecting, by the processor according to at least the first message, a cell of the at least one second cell to add to an uplink CoMP set of a first cell, where the first cell is a cell of the base station.

In a first possible implementation manner of the eighth aspect, the base station further includes a transmitter, configured to send, to multiple first user equipments UE served by the first cell, the configuration information corresponding to the CSI-RS of each of the at least one second cell; and the selecting, by the processor according to at least the first message, a cell of the at least one second cell to add to an uplink CoMP set of a first cell specifically includes:

controlling the transmitter to send, to the multiple first user equipments UE served by the first cell, the configuration information corresponding to the CSI-RS of each of the at least one second cell; and when the receiver further receives receive power information that is obtained through measurement by the multiple first UEs according to the configuration information and that is corresponding to the CSI-RS of the cell of the at least one second cell, determining average receive power from the first cell to the cell of the at least one second cell according to at least the receive power information, and selecting, according to the average receive power, the cell of the at least one second cell to add to the uplink CoMP set of the first cell, where:

the receiver is further configured to receive the receive power information that is obtained through measurement by the multiple first UEs according to the configuration information and that is corresponding to the CSI-RS of the cell of the at least one second cell.

In a second possible implementation manner of the eighth aspect, the base station further includes a transmitter, configured to send, to multiple first user equipments UE served by the first cell, the configuration information corresponding to the CSI-RS of each of the at least one second cell; and the selecting, by the processor according to at least the first message, a cell of the at least one second cell to add to an uplink CoMP set of a first cell specifically includes:

controlling the transmitter to send, to the multiple first UEs, the configuration information corresponding to the CSI-RS of each of the at least one second cell;

when the receiver further receives receive power information that is obtained through measurement by the multiple first UEs according to the configuration information and that is corresponding to the CSI-RS of the cell of the at least one second cell, and when the first message further carries transmit power information corresponding to the CSI-RS of each of the at least one second cell, determining a normalized path loss from the first cell to the cell of the at least one second cell according to the transmit power information corresponding to the CSI-RS of each of the at least one second cell and the receive power information that is obtained through measurement by the multiple first UEs and that is corresponding to the CSI-RS of the cell of the at least one second cell; and selecting, according to at least the normalized path loss from the first cell to the cell of the at least one second cell, the cell of the at least one second cell to add to the uplink CoMP set of the first cell, where:

the receiver is further configured to receive the receive power information that is obtained through measurement by the multiple first UEs according to the configuration information and that is corresponding to the CSI-RS of the cell of the at least one second cell.

With reference to the second possible implementation manner of the eighth aspect, in a third possible implementation manner, the selecting, by the processor according to at least the normalized path loss from the first cell to the cell of the at least one second cell, the cell of the at least one second cell to add to the uplink CoMP set of the first cell specifically includes:

controlling, by the processor, the transmitter to send, to the second base station, transmit power information corresponding to a CSI-RS of the first cell and configuration information corresponding to the CSI-RS of the first cell; and when the receiver further receives a normalized path loss from the at least one second cell to the first cell sent by the second base station, selecting, according to the normalized path loss from the first cell to the cell of the at least one second cell and the normalized path loss from the at least one second cell to the first cell, the cell of the at least one second cell to add to the uplink CoMP set of the first cell, where:

the transmitter is further configured to send, to the second base station, the transmit power information corresponding to the CSI-RS of the first cell and the configuration information corresponding to the CSI-RS of the first cell, where the first cell is determined by a PCI and the CSI-RS; and the receiver is further configured to receive the normalized path loss from the at least one second cell to the first cell sent by the second base station, where the normalized path loss from the at least one second cell to the first cell is determined by the second base station according to at least the transmit power information corresponding to the CSI-RS of the first cell and the configuration information corresponding to the CSI-RS of the first cell.

According to a ninth aspect, an embodiment of the present invention provides a base station, including a transmitter, a receiver, a memory, and a processor, where:

the transmitter is configured to send, to a second base station, transmit power information corresponding to a CSI-RS of a first cell and configuration information corresponding to the CSI-RS of the first cell, where the first cell is a cell of the base station, and the first cell is determined by a PCI and the CSI-RS;

the receiver is configured to receive a normalized path loss from at least one second cell to the first cell sent by the second base station, where the normalized path loss from the at least one second cell to the first cell is determined by the second base station according to at least the transmit power information corresponding to the CSI-RS of the first cell and the configuration information corresponding to the CSI-RS of the first cell; the at least one second cell is a cell of the second base station, and a cell of the at least one second cell is determined by a PCI and the CSI-RS;

the memory is configured to store program code; and the processor is configured to execute the code, where the code includes: controlling, by the processor, the transmitter to send, to the second base station, the transmit power information corresponding to the CSI-RS of the first cell and the configuration information corresponding to the CSI-RS of the first cell; and selecting, according to at least the normalized path loss from the at least one second cell to the first cell received by the receiver, a cell of the at least one second cell to add to an uplink CoMP set of the first cell.

According to a tenth aspect, an embodiment of the present invention provides an uplink CoMP set selecting system, including the base station according to the fourth aspect, the base station according to the fifth aspect, the base station according to the sixth aspect, the base station according to the seventh aspect, the base station according to the eighth aspect, or the base station according to the ninth aspect.

The embodiments of the present application provide an uplink CoMP set selecting method and system, and a device, so that an uplink CoMP set of a first cell or of first UE served by a first cell is determined by means of exchange, between base stations, of at least CSI-RS configuration information used for distinguishing cells.

BRIEF DESCRIPTION OF DRAWINGS

To describe the technical solutions in the embodiments of the present application or in the prior art more clearly, the following briefly introduces the accompanying drawings required for describing the embodiments or the prior art. Apparently, the accompanying drawings in the following description show merely some embodiments of the present application, and a person of ordinary skill in the art may still derive other drawings from these accompanying drawings without creative efforts.

DESCRIPTION OF EMBODIMENTS

The following clearly describes the technical solutions in the embodiments of the present application with reference to the accompanying drawings in the embodiments of the present application. Apparently, the described embodiments are merely some but not all of the embodiments of the present application. All other embodiments obtained by a person of ordinary skill in the art based on the embodiments of the present application without creative efforts shall fall within the protection scope of the present application. The embodiments of the present application provide an uplink CoMP set selecting system, where the system includes a first base station, a second base station, first UE, and second UE.

Based on the foregoing system, an embodiment of the present application provides an uplink CoMP set selecting method, and the method is applicable to a scenario in which first UE served by a first cell has one uplink CoMP set.

Figure 1:
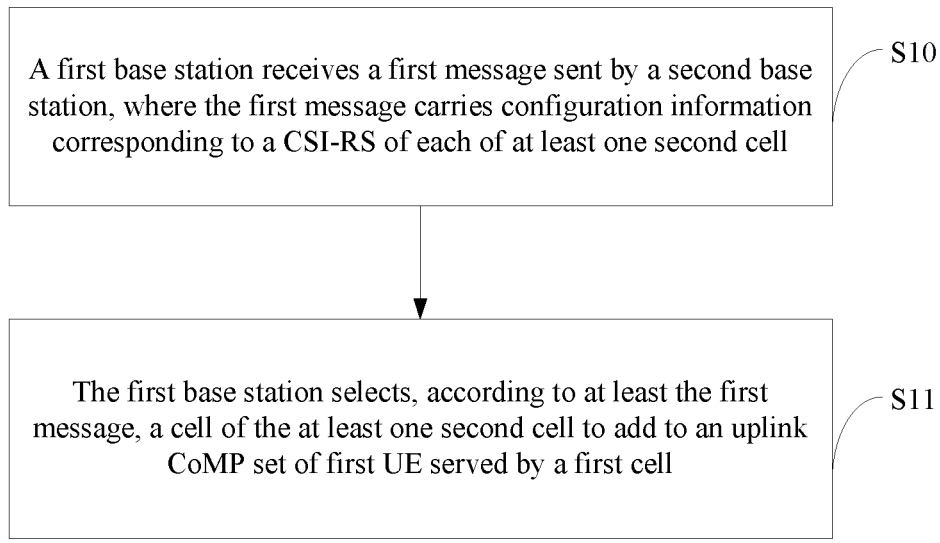
FIG. 1 is a schematic flowchart of an uplink CoMP set selecting method according to Embodiment 1 of the present application.

In Embodiment 1, as shown in FIG. 1, the method includes:

S10: A first base station receives a first message sent by a second base station, where the first message carries configuration information corresponding to a CSI-RS of each cell of at least one second cell.

The at least one second cell is a cell of the second base station, and a cell of the at least one second cell is determined by a PCI and the CSI-RS.

S11: The first base station selects, according to at least the first message, a cell of the at least one second cell to add to an uplink CoMP set of first UE served by a first cell.

The first cell is a cell of the first base station.

The following uses three examples to separately describe a method for selecting the uplink CoMP set of the first UE.

In Example 1, the method includes the following steps:

S101: The first base station receives the first message sent by the second base station, where the first message carries the configuration information corresponding to the CSI-RS of each of the at least one second cell.

In all the embodiments of the present application, the at least one second cell is a cell of the second base station, and a cell of the at least one second cell is determined by a PCI and the CSI-RS.

As a remote radio technology is widely applied, there may be multiple access points covered by one base station, and different cells corresponding to the multiple access points (which may be various network nodes, wireless signal transceivers, remote radio modules, relay stations, base stations, and the like) may have a same PCI; as a result, UE and the base station cannot distinguish cells of different access points according to the PCI. Therefore, in this embodiment of the present application, for a case in which different cells are corresponding to a same PCI, the cells are distinguished according to different configured CSI-RSs of these cells, where different CSI-RS configurations have different CSI reference signaling configuration index numbers, different frequency domain resource configurations, different code domain resource configurations, different antenna port numbers, different subframe configurations, and/or the like. In this embodiment of the present application, one cell may be determined according to a PCI and a CSI-RS.

Figure 2:
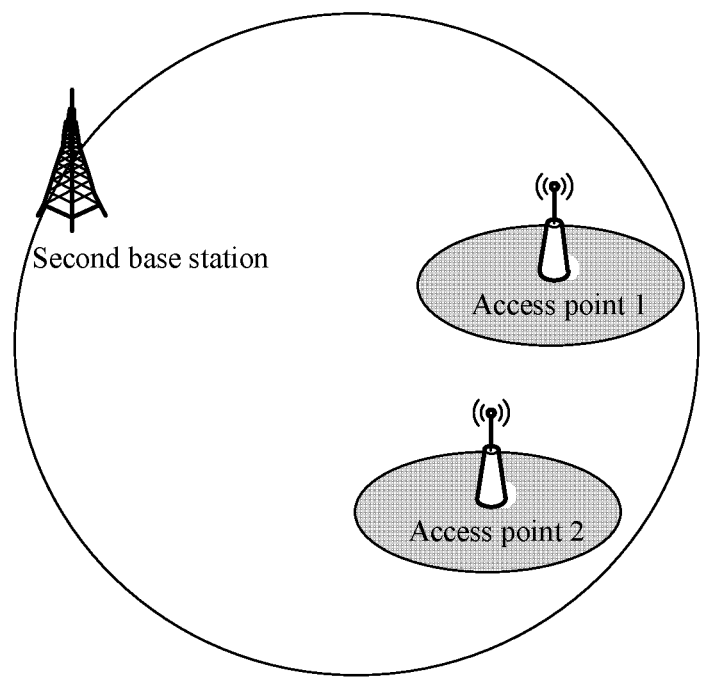
FIG. 2 is a schematic diagram in the prior art in which there are multiple access points covered by a base station.

For example, as shown in FIG. 2, the second base station is used as an example. A cell covered by the second base station is referred to as a second cell, which is represented by cell2. Because PCIs of cells corresponding to access points of the base station may be the same, the cells corresponding to the access points are distinguished by being configured with different CSI-RSs. In this case, cells corresponding to access points 1 and 2 are also referred to as a second cell, and are represented by cell2-1 and cell2-2; cell2-1 and cell2-2 are distinguished by being configured with different CSI-RSs. Certainly, cell2 may also be configured with a CSI-RS.

In all the embodiments of the present application, UE in the second cell is referred to as second UE; UE in the first cell is referred to as first UE.

S102: The first base station sends, to the first UE served by the first cell, the configuration information corresponding to the CSI-RS of each of the at least one second cell.

In all the embodiments of the present application, the first cell is a cell of the first base station, and the first cell is determined by a PCI and the CSI-RS, which are not described herein again.

S103: The first UE obtains, through measurement according to the configuration information, receive power information corresponding to a CSI-RS of a cell of the at least one second cell, and sends the receive power information to the first base station.

For example, descriptions are given by using one second cell; when the first UE located in the first cell receives configuration information, sent by the first base station, corresponding to the CSI-RS of the second cell, the first UE may obtain, through measurement according to the configuration information, receive power information corresponding to the CSI-RS of the second cell.

In all the embodiments of the present application, the receive power information corresponding to the CSI-RS may be referred to as channel state information-reference signal received power (full name: Channel State Information-Reference Signal Received Power, CSI-RSRP for short).

The first UE sends the receive power information of the second cell obtained through measurement to the first base station.

It should be noted that in all the embodiments of the present application, through measurement according to the received configuration information corresponding to the CSI-RS of each of the at least one second cell, the first UE may obtain receive power information of all or some second cells of the at least one second cell, or may obtain no receive power information at all. Therefore, in all the embodiments of the present application, the first UE is first UE that can obtain the receive power information of all or some second cells of the at least one second cell through measurement. Therefore, the "obtaining receive power information corresponding to a CSI-RS of a cell of the at least one second cell" refers to obtaining receive power information corresponding to the CSI-RS of each of the at least one second cell, or obtaining receive power information corresponding to the CSI-RS of each of some second cells of the at least one second cell.

S104: The first base station selects, according to at least the receive power information, the cell of the at least one second cell to add to the uplink CoMP set of the first UE.

Further, the first base station selects, according to the receive power information and a preset rule, the cell of the at least one second cell to add to the uplink CoMP set of the first UE.

The preset rule may be setting a threshold that is referred to as a first preset threshold herein; that is, for any cell of the at least one second cell, when the receive power information corresponding to the CSI-RS of the second cell is greater than the first preset threshold, adding the second cell to the uplink CoMP set of the first UE.

Alternatively, the preset rule may further be: sorting the receive power information corresponding to the CSI-RS of each of the at least one second cell, and selecting second cells corresponding to a preset quantity of highest receive power to add to the uplink CoMP set of the first UE.

In Example 2, the method includes the following steps:

S201: The first base station receives the first message sent by the second base station, where the first message carries the configuration information corresponding to the CSI-RS of each of the at least one second cell.

S202: The first base station sends, to the first UE served by the first cell, the configuration information corresponding to the CSI-RS of each of the at least one second cell.

S203: The first UE obtains, through measurement according to the configuration information, receive power information corresponding to the CSI-RS of the cell of the at least one second cell, and sends the receive power information to the first base station.

S204: When the first message further carries transmit power information corresponding to the CSI-RS of each of the at least one second cell, the first base station determines a path loss from the first UE to the cell of the at least one second cell according to the transmit power information corresponding to the CSI-RS of each of the at least one second cell and the receive power information that is obtained through measurement by the first UE and that is corresponding to the CSI-RS of the cell of the at least one second cell.

Herein, if the first UE obtains, through measurement, receive power information corresponding to the CSI-RS of each of only some second cells of the at least one second cell, the first base station obtains a path loss from the first UE to the some second cells of the at least one second cell only according to the receive power information corresponding to the CSI-RS of each of the some second cells of the at least one second cell and the transmit power information corresponding to the CSI-RS of each of the some second cells of the at least one second cell.

S205: The first base station selects, according to at least the path loss from the first UE to the cell of the at least one second cell, the cell of the at least one second cell to add to the uplink CoMP set of the first UE.

Herein, an example of a method for calculating the path loss from the first UE to the cell of the at least one second cell is as follows: descriptions are given by using one second cell as an example; a path loss from the first UE to the second cell may be recorded as L, transmit power corresponding to the CSI-RS of the second cell is recorded as $P_{CSI-RS}$, and receive power of the second cell obtained through measurement by the first UE is recorded as CSI-RSRP; then:

$$L=\lg(P_{CSI-RS}/\text{CSI-RSRP})=(\lg P_{CSI-RS})-(\lg \text{CSI-RSRP}),$$

and in view of this, obtained L is a dB value; alternatively, $$L=P_{CSI-RS}/\text{CSI-RSRP},$$

and in view of this formula, obtained L is a linear value.

It can be known from the foregoing two formulas that in a case of same transmit power, a larger path loss leads to smaller receive power.

Further, the first base station selects, according to the path loss from the first UE to the cell of the at least one second cell and a preset rule, the cell of the at least one second cell to add to the uplink CoMP set of the first UE.

The preset rule may be setting a threshold that is referred to as a second preset threshold herein; that is, for a path loss from the first UE to each second cell of the at least one second cell, when the path loss from the first UE to the second cell is less than the second preset threshold, adding the second cell to the uplink CoMP set of the first UE.

It should be noted that when a value of the path loss from the first UE to the second cell is a dB value, the second preset threshold is also a dB value; when a value of the path loss from the first UE to the second cell is a linear value, the second preset threshold is also a linear value.

Alternatively, the preset rule may further be: sorting path losses from the first UE to all second cells of the at least one second cell, and selecting second cells corresponding to a preset quantity of smallest path losses to add to the uplink CoMP set of the first UE.

In Example 3, the method includes the following steps:

S301: The first base station receives the first message sent by the second base station, where the first message carries the configuration information corresponding to the CSI-RS of each of the at least one second cell.

S302: The first base station sends, to the first UE served by the first cell, the configuration information corresponding to the CSI-RS of each of the at least one second cell.

S303: The first UE obtains, through measurement according to the configuration information, receive power information corresponding to the CSI-RS of the cell of the at least one second cell, and sends the receive power information to the first base station.

S304: When the first message further carries transmit power information corresponding to the CSI-RS of each of the at least one second cell, the first base station determines a path loss from the first UE to the cell of the at least one second cell according to the transmit power information corresponding to the CSI-RS of each of the at least one second cell and the receive power information that is obtained through measurement by the first UE and that is corresponding to the CSI-RS of the cell of the at least one second cell.

S305: The first base station sends, to the second base station, transmit power information corresponding to a CSI-RS of the first cell and configuration information corresponding to the CSI-RS of the first cell.

Further, for each second cell of the at least one second cell, the second base station obtains a normalized path loss from the second cell to the first cell according to the transmit power information corresponding to the CSI-RS of the first cell and receive power information of the first cell obtained through measurement according to the configuration information corresponding to the CSI-RS of the first cell by multiple second UEs served by the second cell.

Alternatively, for each second cell of the at least one second cell, the second base station may obtain a normalized weighted path loss from the second cell to the first cell according to the transmit power information corresponding to the CSI-RS of the first cell, receive power information of the first cell obtained through measurement according to the configuration information corresponding to the CSI-RS of the first cell by multiple second UEs served by the second cell, and a fixed weight value, where the fixed weight value may be transmit power of the multiple second UEs.

For any second cell of the at least one second cell, an example of a method for calculating the normalized path loss from the second cell to the first cell is as follows: descriptions are given by using multiple second UEs being UEi, where i=1, 2, ..., and $N_0$, and a value of $N_0$ may be self-defined in an actual application process, which is not limited herein; the UEi is UE located in the second cell.

The first cell is recorded as j, a path loss from the UEi to the first cell is recorded as L(i, j), and the normalized path loss from the second cell to the first cell is recorded as L(j); then L(j) may be calculated according to the following formula:

$$L(j) = \frac{\sum_{i=1}^{N_0} L(i, j)}{N_0};$$

however, this embodiment of the present application is not limited thereto, and the formula may also be:

$$L(j) = \frac{\sum_{i=1}^{N_0} \sqrt{L(i, j)}}{N_0}, L(j) = \frac{\sum_{i=1}^{N_0} \log(L(i, j))}{N_0}, L(j) = \frac{N_0}{\sum_{i=1}^{N_0} \frac{1}{L(i, j)}},$$

or the like.

The path loss L(i, j) from the UEi to the first cell is obtained according to the transmit power information of the first cell and the receive power information obtained through measurement by the UEi according to the configuration information corresponding to the CSI-RS of the first cell, which is not described herein again.

For each second cell of the at least one second cell, the normalized path loss from the second cell to the first cell may be calculated according to the foregoing formulas.

For any second cell of the at least one second cell, an example of a method for calculating the normalized weighted path loss from the second cell to the first cell is as follows: descriptions are given by using multiple second UEs being UEi, where i=1, 2, ... , and $N_0$, and a value of $N_0$ may be self-defined in an actual application process, which is not limited herein; the UEi is UE located in the second cell.

The first cell is recorded as j, a value of a path loss from the UEi to the first cell is recorded as L(i, j), uplink transmit power of the UEi is recorded as Pi, and the normalized weighted path loss from the second cell to the first cell is recorded as L'(j); then L'(j) may be calculated according to the following formula:

$$L'(j) = \frac{N_0}{\sum_{i=1}^{N_0} \frac{P_i}{L(i,j)}}, L'(j) = \frac{\sum_{i=1}^{N_0} \frac{L(i,j)}{P_i}}{N_0},$$

or the like.

For each second cell of the at least one second cell, the normalized weighted path loss from the second cell to the first cell may be calculated according to the foregoing formulas.

S306: The first base station receives a normalized path loss from the at least one second cell to the first cell sent by the second base station.

It should be noted that in all the embodiments of the present application, the normalized path loss from the second cell to the first cell includes the normalized weighted path loss from the second cell to the first cell.

S307: The first base station selects, according to at least the path loss from the first UE to the cell of the at least one second cell and the normalized path loss from the at least one second cell to the first cell, the cell of the at least one second cell to add to the uplink CoMP set of the first UE.

It should be noted that when the first base station obtains only a path loss from the first UE to some second cells of the at least one second cell, the first base station selects, according to at least the path loss from the first UE to the some second cells of the at least one second cell and a normalized path loss from the some second cells of the at least one second cell to the first cell, a cell of the at least one second cell to add to the uplink CoMP set of the first UE.

Further, the first base station selects, according to at least the path loss from the first UE to the cell of the at least one second cell, the normalized path loss from the at least one second cell to the first cell, and a preset rule, the cell of the at least one second cell to add to the uplink CoMP set of the first UE.

The preset rule may be setting a threshold that is referred to as a third preset threshold herein; that is, for each second cell of the at least one second cell, multiplying the normalized path loss from the second cell to the first cell by the path loss from the first UE to the second cell, where a result is referred to as a first multiplying result herein; and when the first multiplying result is less than the third preset threshold, adding the second cell corresponding to the first multiplying result to the uplink CoMP set of the first UE.

Alternatively, the preset rule may further be: for each of the at least one second cell, sorting a first multiplying result obtained by multiplying the normalized path loss from the second cell to the first cell by the path loss from the first UE to the second cell, and adding second cells corresponding to a preset quantity of smallest first multiplying results to the uplink CoMP set of the first UE.

Alternatively, the preset rule may further be setting a threshold that is referred to as a fourth preset threshold herein; that is, for each of the at least one second cell, multiplying the normalized weighted path loss from the second cell to the first cell by the path loss from the first UE to the second cell, where a result is referred to as a second multiplying result herein; and when the second multiplying result is less than the fourth preset threshold, adding the second cell corresponding to the second multiplying result to the uplink CoMP set of the first UE.

Alternatively, the preset rule may further be: for each second cell of the at least one second cell, sorting a second multiplying result obtained by multiplying the normalized weighted path loss from the second cell to the first cell by the path loss from the first UE to the second cell, and adding second cells corresponding to a preset quantity of smallest second multiplying results to the uplink CoMP set of the first UE.

This embodiment of the present application provides an uplink CoMP set selecting method. A second base station sends configuration information corresponding to a CSI-RS of each cell of at least one second cell to a first base station, so that, in a first aspect, the first base station can obtain, according to the configuration information corresponding to the CSI-RS of each of the at least one second cell, receive power information that is obtained through measurement by first UE served by a first cell and that is corresponding to the CSI-RS of a cell of the at least one second cell, and determine, according to the receive power information, whether to add the cell of the at least one second cell to an uplink CoMP set of the first UE; in a second aspect, the first base station can obtain a path loss from first UE to a cell of the at least one second cell according to transmit power information corresponding to the CSI-RS of each of the at least one second cell, and determine, according to the path loss, whether to add the at least one second cell to an uplink CoMP set of the first UE; or in a third aspect, the first base station sends, to the second base station, transmit power information and configuration information that are corresponding to a CSI-RS of a first cell, and determines, according to a received normalized path loss from the at least one second cell to the first cell sent by the second base station and a path loss from the first cell to a cell of the at least one second cell, whether to add the cell of the at least one second cell to an uplink CoMP set of the first UE.

An embodiment of the present application provides an uplink CoMP set selecting method, and the method is applicable to a scenario in which a first cell has one uplink CoMP set.

Figure 3:
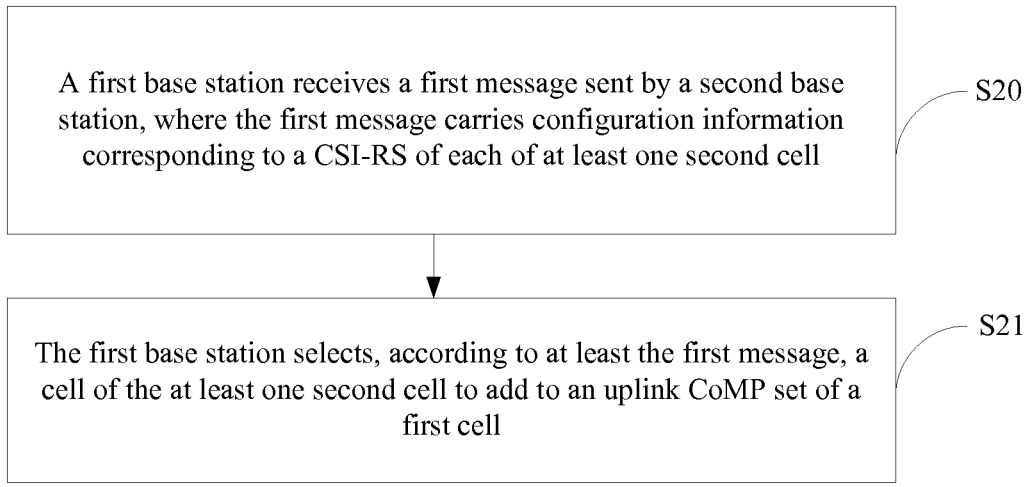
FIG. 3 is a schematic flowchart of an uplink CoMP set selecting method according to Embodiment 2 of the present application.

In Embodiment 2, as shown in FIG. 3, the method includes the following steps:

S20: A first base station receives a first message sent by a second base station, where the first message carries configuration information corresponding to a CSI-RS of each cell of at least one second cell.

S21: The first base station selects, according to at least the first message, a cell of the at least one second cell to add to an uplink CoMP set of a first cell.

The following uses three examples to separately describe a method for selecting the uplink CoMP set of the first cell.

In Example 1, the method includes the following steps:

S401: The first base station receives the first message sent by the second base station, where the first message carries the configuration information corresponding to the CSI-RS of each of the at least one second cell.

S402: The first base station sends, to multiple first UEs served by the first cell, the configuration information corresponding to the CSI-RS of each of the at least one second cell.

S403: The multiple first UEs obtain, through measurement according to the configuration information, receive power information corresponding to a CSI-RS of a cell of the at least one second cell, and send the receive power information to the first base station.

It should be noted that in all the embodiments of the present application, through measurement according to the received configuration information corresponding to the CSI-RS of each of the at least one second cell, the multiple first UEs may obtain receive power information of all or some second cells of the at least one second cell, or may obtain no receive power information at all. Therefore, in all the embodiments of the present application, the "obtaining receive power information corresponding to a CSI-RS of a cell of the at least one second cell" refers to obtaining receive power information corresponding to the CSI-RS of each of the at least one second cell, or obtaining receive power information corresponding to the CSI-RS of each of some second cells of the at least one second cell.

S404: The first base station determines average receive power from the first cell to the cell of the at least one second cell according to at least the receive power information, and selects, according to the average receive power, the cell of the at least one second cell to add to the uplink CoMP set of the first cell.

Exemplarily, for any second cell of the at least one second cell, a method for calculating the average receive power from the first cell to the second cell may be that: descriptions are given by using an example in which the multiple first UEs are N first UEs; receive power information of the second cell obtained through measurement by a first piece of first UE is recorded as $CSI\text{-}RSRP_1$, receive power information of the second cell obtained through measurement by a second piece of first UE is recorded as $CSI\text{-}RSRP_2$, receive power information of the second cell obtained through measurement by a third piece of first UE is recorded as $CSI\text{-}RSRP_3$, and receive power information of the second cell obtained through measurement by an $N^{th}$ piece of first UE is recorded as $CSI\text{-}RSRP_N$; therefore, the average receive power from the first cell to the second cell may be obtained according to the following formula:

$$(CSI\text{-}RSRP_1 + CSI\text{-}RSRP_2 + CSI\text{-}RSRP_3 + \ldots + CSI\text{-}RSRP_N)/N,$$

where a value of N may be self-defined according to an actual situation, which is not limited in this embodiment of the present application.

Calculation may be performed on each of the at least one second cell according to the foregoing formula, to obtain average receive power from the first cell to each of the at least one second cell. However, this embodiment of the present application is not limited thereto; another calculation manner based on receive power may be applicable, which is not limited herein.

Further, the first base station selects, according to the average receive power and a preset rule, the cell of the at least one second cell to add to the uplink CoMP set of the first cell.

The preset rule may be setting a threshold that is referred to as a fifth preset threshold herein; that is, for each second cell of the at least one second cell, when the average receive power from the first cell to the second cell is greater than the fifth preset threshold, adding the second cell to the uplink CoMP set of the first cell.

Alternatively, the preset rule may further be: sorting the average receive power from the first cell to the at least one second cell, and selecting second cells corresponding to a preset quantity of greatest average receive power to add to the uplink CoMP set of the first cell.

In Example 2, the method includes the following steps:

S501: The first base station receives a first message sent by the second base station, where the first message carries the configuration information corresponding to the CSI-RS of each of the at least one second cell.

S502: The first base station sends, to multiple first UEs served by the first cell, the configuration information corresponding to the CSI-RS of each of the at least one second cell.

S503: The multiple first UEs obtain, through measurement according to the configuration information, receive power information corresponding to a CSI-RS of a cell of the at least one second cell, and send the receive power information to the first base station.

S504: When the first message further carries transmit power information corresponding to the CSI-RS of each of the at least one second cell, the first base station determines a normalized path loss from the first cell to the cell of the at least one second cell according to the transmit power information corresponding to the CSI-RS of each of the at least one second cell and the receive power information that is obtained through measurement by the multiple first UEs and that is corresponding to the CSI-RS of the cell of the at least one second cell.

Alternatively, when the first message further carries transmit power information corresponding to the CSI-RS of each of the at least one second cell, the first base station determines a normalized weighted path loss from the first cell to the cell of the at least one second cell according to the transmit power information corresponding to the CSI-RS of each of the at least one second cell, the receive power information that is obtained through measurement by the multiple first UEs and that is corresponding to the CSI-RS of the cell of the at least one second cell, and a fixed weight value.

Herein, a method for calculating the normalized path loss from the first cell to each of the at least one second cell or a method for calculating the normalized weighted path loss from the first cell to each of the at least one second cell is the same as that in S305, and is not described herein again.

S505: The first base station selects, according to at least the normalized path loss from the first cell to the cell of the at least one second cell, the cell of the at least one second cell to add to the uplink CoMP set of the first cell.

Further, the first base station selects, according to at least the normalized path loss from the first cell to the cell of the at least one second cell and a preset rule, the cell of the at least one second cell to add to the uplink CoMP set of the first cell.

The preset rule may be setting a threshold that is referred to as a sixth preset threshold herein; that is, for each of the at least one second cell, when the normalized path loss from the first cell to the second cell is less than the sixth preset threshold, adding the second cell to the uplink CoMP set of the first cell.

Alternatively, the preset rule may further be: sorting the normalized path loss from the first cell to each of the at least one second cell, and selecting second cells corresponding to a preset quantity of smallest normalized path losses to add to the uplink CoMP set of the first cell.

Alternatively, the preset rule may further be setting a threshold that is referred to as a seventh preset threshold herein; that is, for each of the at least one second cell, when the normalized weighted path loss from the first cell to the second cell is less than the seventh preset threshold, adding the second cell to the uplink CoMP set of the first cell.

Alternatively, the preset rule may further be: sorting the normalized weighted path loss from the first cell to each of the at least one second cell, and selecting second cells corresponding to a preset quantity of smallest normalized weighted path losses to add to the uplink CoMP set of the first cell.

In Example 3, the method includes the following steps:

S601: The first base station receives the first message sent by the second base station, where the first message carries the configuration information corresponding to the CSI-RS of each of the at least one second cell.

S602: The first base station sends, to multiple first UEs served by the first cell, the configuration information corresponding to the CSI-RS of each of the at least one second cell.

S603: The multiple first UEs obtain, through measurement according to the configuration information, receive power information corresponding to a CSI-RS of a cell of the at least one second cell, and send the receive power information to the first base station.

S604: When the first message further carries transmit power information corresponding to the CSI-RS of each of the at least one second cell, the first base station determines a normalized path loss from the first cell to the cell of the at least one second cell according to at least the transmit power information corresponding to the CSI-RS of each of the at least one second cell and the receive power information that is obtained through measurement by the multiple first UEs and that is corresponding to the CSI-RS of the cell of the at least one second cell.

For any one of the at least one second cell, a normalized weighted path loss from the first cell to the second cell may be obtained according to the path loss from the multiple first UEs in the first cell to the second cell and a fixed weight value, where the fixed weight value may be transmit power of the first UE.

S605: The first base station sends, to the second base station, transmit power information corresponding to a CSI-RS of the first cell and configuration information corresponding to the CSI-RS of the first cell.

Further, for each of the at least one second cell, the second base station obtains a normalized path loss from the second cell to the first cell according to the transmit power information corresponding to the CSI-RS of the first cell and receive power information that is obtained through measurement by multiple second UEs served by the second cell and that is corresponding to the CSI-RS of the first cell.

Alternatively, for each of the at least one second cell, the second base station obtains a normalized weighted path loss from the second cell to the first cell according to the transmit power information corresponding to the CSI-RS of the first cell, receive power information that is obtained through measurement by multiple second UEs served by the second cell and that is corresponding to the CSI-RS of the first cell, and a fixed weight value, where the fixed weight value may be transmit power of at least one piece of second UE served by the second cell.

S606: The first base station receives a normalized path loss from the at least one second cell to the first cell sent by the second base station.

S607: The first base station selects, according to the normalized path loss from the first cell to the cell of the at least one second cell and the normalized path loss from the at least one second cell to the first cell, the cell of the at least one second cell to add to the uplink CoMP set of the first cell.

Further, the first base station selects, according to the normalized path loss from the first cell to the cell of the at least one second cell, the normalized path loss from the at least one second cell to the first cell, and a preset rule, the cell of the at least one second cell to add to the uplink CoMP set of the first cell.

The preset rule may be setting a threshold that is referred to as an eighth preset threshold herein; that is, for each of the at least one second cell, multiplying the normalized path loss from the first cell to the second cell by the normalized path loss from the second cell to the first cell, where a result is referred to as a third multiplying result; and when the third multiplying result is less than the eighth preset threshold, adding the second cell corresponding to the third multiplying result to the uplink CoMP set of the first cell.

Alternatively, the preset rule may further be: for each of the at least one second cell, sorting a third multiplying result obtained by multiplying the normalized path loss from the first cell to the second cell by the normalized path loss from the second cell to the first cell, and adding second cells corresponding to a preset quantity of smallest third multiplying results to the uplink CoMP set of the first cell.

Alternatively, the preset rule may further be setting a threshold that is referred to as a ninth preset threshold herein; that is, for each of the at least one second cell, multiplying the normalized weighted path loss from the first cell to the second cell by the normalized weighted path loss from the second cell to the first cell, where a result is referred to as a fourth multiplying result; and when the fourth multiplying result is less than the ninth preset threshold, adding the second cell corresponding to the fourth multiplying result to the uplink CoMP set of the first cell.

Alternatively, the preset rule may further be: for each of the at least one second cell, sorting a fourth multiplying result obtained by multiplying the normalized weighted path loss from the first cell to the second cell by the normalized weighted path loss from the second cell to the first cell, and adding second cells corresponding to a preset quantity of smallest fourth multiplying results to the uplink CoMP set of the first cell.

In this example, descriptions are given by using an example in which the normalized path loss from the first cell to the second cell is multiplied by the normalized path loss from the second cell to the first cell, or the normalized weighted path loss from the first cell to the second cell is multiplied by the normalized weighted path loss from the second cell to the first cell. However, this embodiment of the present application is not limited thereto, and the normalized path loss from the first cell to the second cell may be multiplied by the normalized weighted path loss from the second cell to the first cell, or the normalized weighted path loss from the first cell to the second cell may be multiplied by the normalized path loss from the second cell to the first cell.

This embodiment of the present application provides an uplink CoMP set selecting method. A second base station sends configuration information corresponding to a CSI-RS of each cell of at least one second cell to a first base station, so that, in a first aspect, the first base station can obtain, according to the configuration information corresponding to the CSI-RS of each of the at least one second cell, receive power information that is obtained through measurement by multiple first UEs served by a first cell and that is corresponding to the CSI-RS of a cell of the at least one second cell, further obtain average receive power from the first cell to the cell of the at least one second cell, and determine, according to the average receive power, whether to add the at least one second cell to an uplink CoMP set of the first cell; in a second aspect, the first base station can obtain a normalized path loss from a first cell to a cell of the at least one second cell according to transmit power information and the configuration information that are corresponding to the CSI-RS of each of the at least one second cell, and determine, according to the normalized path loss, whether to add the at least one second cell to an uplink CoMP set of the first cell; or in a third aspect, the first base station sends, to the second base station, transmit power information and configuration information that are corresponding to a CSI-RS of a first cell, and determines, according to a received normalized path loss from the at least one second cell to the first cell sent by the second base station and a normalized path loss from the first cell to a cell of the at least one second cell, whether to add the cell of the at least one second cell to an uplink CoMP set of the first cell.

Another embodiment of the present application provides an uplink CoMP set selecting method, and the method is applicable to a scenario in which a first cell has one CoMP set.

Figure 4:
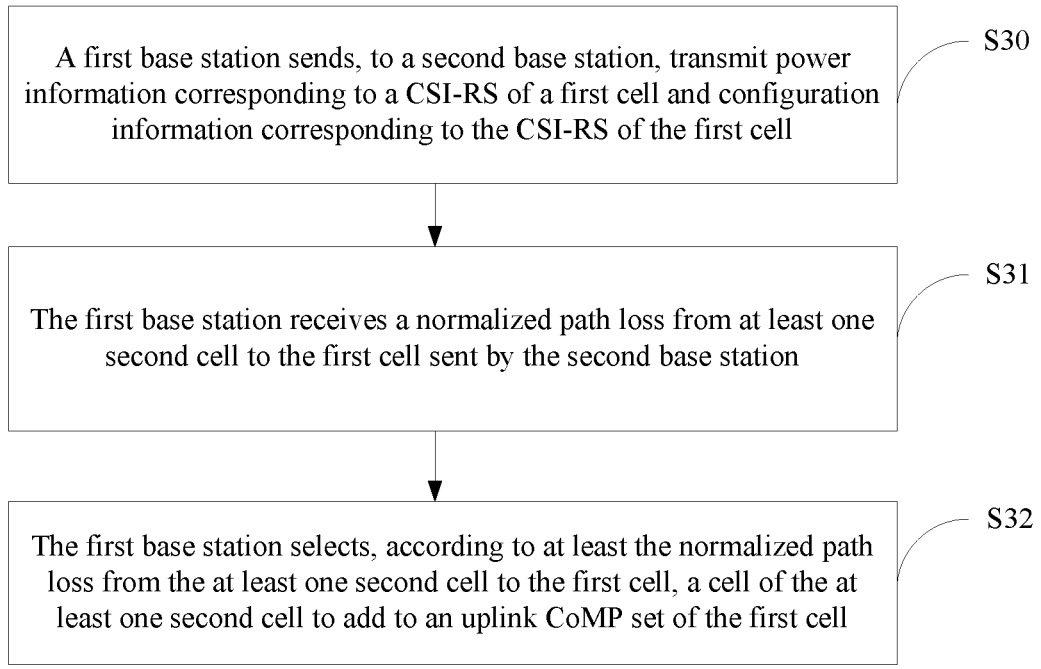
FIG. 4 is a schematic flowchart of an uplink CoMP set selecting method according to Embodiment 3 of the present application.

In Embodiment 3, as shown in FIG. 4, the method includes:

S30: A first base station sends, to a second base station, transmit power information corresponding to a CSI-RS of a first cell and configuration information corresponding to the CSI-RS of the first cell.

For each cell of at least one second cell, the second base station obtains, according to the transmit power information corresponding to the CSI-RS of the first cell and receive power information that is obtained through measurement according to the configuration information corresponding to the CSI-RS of the first cell by multiple second UEs served by the second cell and that is corresponding to the CSI-RS of the first cell, a normalized path loss from the second cell to the first cell.

Alternatively, for each cell of at least one second cell, the second base station obtains, according to the transmit power information corresponding to the CSI-RS of the first cell, receive power information that is obtained through measurement according to the configuration information corresponding to the CSI-RS of the first cell by multiple second UEs served by the second cell and that is corresponding to the CSI-RS of the first cell, and a fixed weight value, a normalized weighted path loss from the second cell to the first cell, where the fixed weight value may be transmit power of the multiple second UEs served by the second cell.

S31: The first base station receives a normalized path loss from at least one second cell to the first cell sent by the second base station.

S32: The first base station selects, according to at least the normalized path loss from the at least one second cell to the first cell, a cell of the at least one second cell to add to an uplink CoMP set of the first cell.

Further, the first base station selects, according to the normalized path loss from the at least one second cell to the first cell and a preset rule, the cell of the at least one second cell to add to the uplink CoMP set of the first cell.

The preset rule may be setting a threshold that is referred to as a tenth preset threshold herein; that is, for each of the at least one second cell, when the normalized path loss from the second cell to the first cell is less than the tenth preset threshold, adding the second cell to the uplink CoMP set of the first cell.

Alternatively, the preset rule may further be: sorting the normalized path loss from the at least one second cell to the first cell, and adding second cells corresponding to a preset quantity of the smallest normalized path losses to the uplink CoMP set of the first cell.

Alternatively, the preset rule may further be setting a threshold that is referred to as an eleventh preset threshold herein; that is, for each of the at least one second cell, when the normalized weighted path loss from the second cell to the first cell is less than the eleventh preset threshold, adding the second cell to the uplink CoMP set of the first cell.

Alternatively, the preset rule may further be: sorting the normalized weighted path loss from the at least one second cell to the first cell, and adding second cells corresponding to a preset quantity of the smallest normalized weighted path losses to the uplink CoMP set of the first cell.

This embodiment of the present application provides an uplink CoMP set selecting method. A first base station sends, to a second base station, transmit power information and configuration information that are corresponding to a CSI-RS of a first cell, so that the second base station obtains a normalized path loss from at least one second cell to the first cell, and sends the normalized path loss to the first base station; and the first base station determines, according to the normalized path loss, whether to add a cell of the at least one second cell to an uplink CoMP set of the first cell.

An embodiment of the present application provides a base station 10, where the base station 10 is corresponding to the first base station in the uplink CoMP set selecting method provided by Embodiment 1; therefore, detailed descriptions of units may be the descriptions of the foregoing steps, and are not described herein again.

Figure 5:
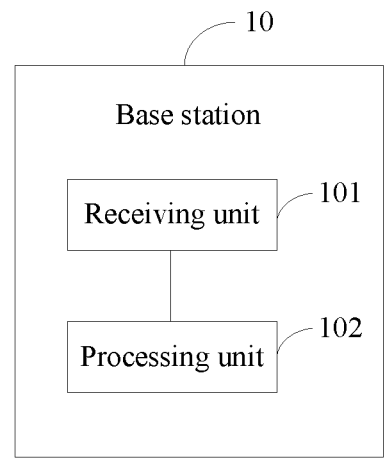
FIG. 5 is schematic block diagram 1 of a structure of a base station according to Embodiment 4 of the present application.

In Embodiment 4, as shown in FIG. 5, FIG. 5 is a functional block diagram of the base station 10 provided by this embodiment of the present application, and the base station 10 includes:

a receiving unit 101, configured to receive a first message sent by a second base station, where the first message carries configuration information corresponding to a CSI-RS of each cell of at least one second cell; the at least one second cell is a cell of the second base station, and a cell of the at least one second cell is determined by a PCI and the CSI-RS; and a processing unit 102, configured to select, according to at least the first message received by the receiving unit 101, a cell of the at least one second cell to add to an uplink CoMP set of first UE served by a first cell, where the first cell is a cell of the base station.

Figure 6:
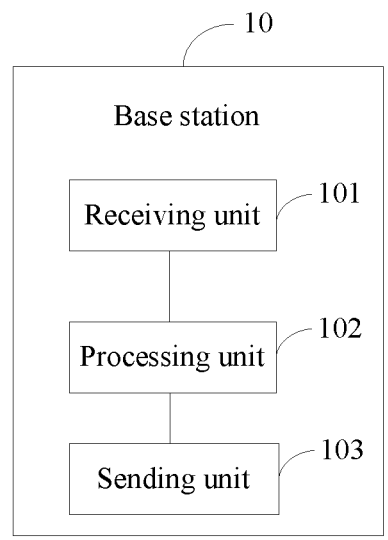
FIG. 6 is schematic block diagram 2 of a structure of a base station according to Embodiment 4 of the present application.

In Example 1, as shown in FIG. 6, FIG. 6 is another functional block diagram of the base station 10 provided by this embodiment of the present application, and the base station 10 includes:

the receiving unit 101, configured to receive the first message sent by the second base station, where the first message carries the configuration information corresponding to the CSI-RS of each of the at least one second cell; and a sending unit 103, configured to send, to the first UE, the configuration information corresponding to the CSI-RS of each of the at least one second cell.

In this case, the receiving unit 101 is further configured to receive power information that is obtained through measurement by the first UE according to the configuration information and that is corresponding to the CSI-RS of the cell of the at least one second cell; and the processing unit 102 is specifically configured to: instruct the sending unit 103 to send, to the first UE, the configuration information corresponding to the CSI-RS of each of the at least one second cell; and select, according to at least the receive power information received by the receiving unit 101, the at least one second cell to add to the uplink CoMP set of the first UE.

Further, the processing unit 102 is specifically configured to select, according to the receive power information received by the receiving unit 101 and a preset rule, the at least one second cell to add to the uplink CoMP set of the first UE.

The preset rule may be setting a threshold that is referred to as a first preset threshold herein; that is, for each of the at least one second cell, when the receive power information corresponding to the CSI-RS of the second cell is greater than the first preset threshold, determining to add the second cell to the uplink CoMP set of the first UE.

Alternatively, the preset rule may further be: sorting the receive power information corresponding to the CSI-RS of the cell of the at least one second cell, and adding second cells corresponding to a preset quantity of highest receive power to the uplink CoMP set of the first UE.

In Example 2, as shown in FIG. 6, the base station 10 includes:

the receiving unit 101, configured to receive the first message sent by the second base station, where the first message carries the configuration information corresponding to the CSI-RS of each of the at least one second cell; and a sending unit 103, configured to send, to the first UE, the configuration information corresponding to the CSI-RS of each of the at least one second cell.

In this case, the receiving unit 101 is further configured to receive power information that is obtained through measurement by the first UE according to the configuration information and that is corresponding to the CSI-RS of the cell of the at least one second cell; and the processing unit 102 is specifically configured to instruct the sending unit 103 to send, to the first UE, the configuration information corresponding to the CSI-RS of each of the at least one second cell; when the first message received by the receiving unit 101 further carries transmit power information corresponding to the CSI-RS of each of the at least one second cell, the processing unit 102 is further specifically configured to: determine a path loss from the first UE to the cell of the at least one second cell according to the transmit power information corresponding to the CSI-RS of each of the at least one second cell and the receive power information that is obtained through measurement by the first UE and that is corresponding to the CSI-RS of the cell of the at least one second cell; and select, according to at least the path loss from the first UE to the cell of the at least one second cell, the cell of the at least one second cell to add to the uplink CoMP set of the first UE.

A method for calculating a value of the path loss from the first UE to each cell of the at least one second cell is consistent with that in the foregoing method, and is not described herein again.

Further, the processing unit 102 is specifically configured to select, according to the path loss from the first UE to the cell of the at least one second cell and a preset rule, the cell of the at least one second cell to add to the uplink CoMP set of the first UE.

The preset rule may be setting a threshold that is referred to as a second preset threshold herein; that is, for each of the at least one second cell, when the path loss from the first UE to the second cell is less than the second preset threshold, determining to add the second cell to the uplink CoMP set of the first UE.

Alternatively, the preset rule may further be sorting the path losses from the first UE to the cell of the at least one second cell, and adding second cells corresponding to a preset quantity of smallest path losses to the uplink CoMP set of the first UE.

In Example 3, referring to FIG. 6, the base station 10 includes:

the receiving unit 101, configured to receive the first message sent by the second base station, where the first message carries the configuration information corresponding to the CSI-RS of each of the at least one second cell; and a sending unit 103, configured to send, to the first UE, the configuration information corresponding to the CSI-RS of each of the at least one second cell.

In this case, the receiving unit 101 is further configured to receive power information that is obtained through measurement by the first UE according to the configuration information and that is corresponding to the CSI-RS of the cell of the at least one second cell.

Further, the sending unit 103 is further configured to send, to the second base station, transmit power information corresponding to a CSI-RS of the first cell and configuration information corresponding to the CSI-RS of the first cell, where the first cell is determined by a PCI and the CSI-RS.

The receiving unit 101 is further configured to receive a normalized path loss from the at least one second cell to the first cell sent by the second base station, where the normalized path loss from the at least one second cell to the first cell is determined by the second base station according to at least the transmit power information corresponding to the CSI-RS of the first cell and the configuration information corresponding to the CSI-RS of the first cell.

Herein, the normalized path loss includes a normalized weighted path loss, and a calculation method thereof is not described herein again.

The processing unit 102 is specifically configured to: instruct the sending unit 103 to send, to the first UE, the configuration information corresponding to the CSI-RS of each of the at least one second cell; and instruct the sending unit 103 to send, to the second base station, the transmit power information corresponding to the CSI-RS of the first cell and the configuration information corresponding to the CSI-RS of the first cell; when the first message received by the receiving unit 101 further carries transmit power information corresponding to the CSI-RS of each of the at least one second cell, the processing unit 102 is further specifically configured to: determine a path loss from the first UE to the cell of the at least one second cell according to the transmit power information corresponding to the CSI-RS of each of the at least one second cell and the receive power information that is obtained through measurement by the first UE and that is corresponding to the CSI-RS of the cell of the at least one second cell; and select, according to at least the path loss from the first UE to the cell of the at least one second cell and the normalized path loss from the at least one second cell to the first cell, the cell of the at least one second cell to add to the uplink CoMP set of the first UE.

Further, the processing unit 102 is specifically configured to select, according to the path loss from the first UE to the cell of the at least one second cell, the normalized path loss from the at least one second cell to the first cell, and a preset rule, the cell of the at least one second cell to add to the uplink CoMP set of the first UE.

The preset rule may be setting a threshold that is referred to as a third preset threshold herein; that is, for each second cell of the at least one second cell, multiplying the normalized path loss from the second cell to the first cell by the path loss from the first UE to the second cell, where a result is referred to as a first multiplying result; and when the first multiplying result is less than the third preset threshold, adding the second cell corresponding to the first multiplying result to the uplink CoMP set of the first UE.

Alternatively, the preset rule may be: for each second cell of the at least one second cell, sorting first multiplying result obtained by multiplying the normalized path loss from the second cell to the first cell by the path loss from the first UE to the second cell, and adding second cells corresponding to a preset quantity of smallest first multiplying results to the uplink CoMP set of the first UE.

Alternatively, the preset rule may further be setting a threshold that is referred to as a fourth preset threshold herein; that is, for each second cell of the at least one second cell, multiplying the normalized weighted path loss from the second cell to the first cell by the path loss from the first UE to the second cell, where a result is referred to as a second multiplying result; and when the second multiplying result is less than the fourth preset threshold, adding the second cell corresponding to the second multiplying result to the uplink CoMP set of the first UE.

Alternatively, the preset rule may further be: for each second cell of the at least one second cell, sorting the second multiplying result obtained by multiplying the normalized weighted path loss from the second cell to the first cell by the path loss from the first UE to the second cell, and adding second cells corresponding to a preset quantity of smallest second multiplying results to the uplink CoMP set of the first UE.

It should be noted that for the foregoing base station 10, in terms of hardware implementation, the sending unit 103 may be a transmitter or a transceiver, the receiving unit 101 may be a receiver or a transceiver, and the sending unit 103 and the receiving unit 101 may be integrated to form a transceiver unit, and corresponding to hardware, are implemented as a transceiver. The processing unit 102 may, in hardware form, be embedded in or be independent from a processor of the base station, or may, in software form, be stored in a memory of the base station, so as to be called by the processor to execute operations corresponding to the foregoing modules. The processor may be a central processing unit (CPU), a microprocessor, a single-chip microcomputer, or the like.

This embodiment of the present application provides a base station. A receiving unit receives configuration information, sent by a second base station, corresponding to a CSI-RS of each cell of at least one second cell, so that, in a first aspect, a processing unit can obtain, according to the configuration information corresponding to the CSI-RS of each of the at least one second cell, receive power information that is obtained through measurement by first UE served by a first cell and that is corresponding to the CSI-RS of a cell of the at least one second cell, and determine, according to the receive power information, whether to add the cell of the at least one second cell to an uplink CoMP set of the first UE; in a second aspect, a processing unit can obtain a path loss from first UE to a cell of the at least one second cell according to transmit power information corresponding to the CSI-RS of each of the at least one second cell, and determine, according to the path loss, whether to add the cell of the at least one second cell to an uplink CoMP set of the first UE; or in a third aspect, a processing unit controls a sending unit to send, to the second base station, transmit power information and configuration information that are corresponding to a CSI-RS of a first cell, and determines, according to a normalized path loss, received by the receiving unit, from the at least one second cell to the first cell sent by the second base station and a path loss from first UE to a cell of the at least one second cell, whether to add the cell of the at least one second cell to an uplink CoMP set of the first UE.

An embodiment of the present application provides a base station 20, where the base station 20 is corresponding to the first base station in the uplink CoMP set selecting method provided by Embodiment 2; therefore, detailed descriptions of units may be the descriptions of the foregoing steps, and are not described herein again.

Figure 7:
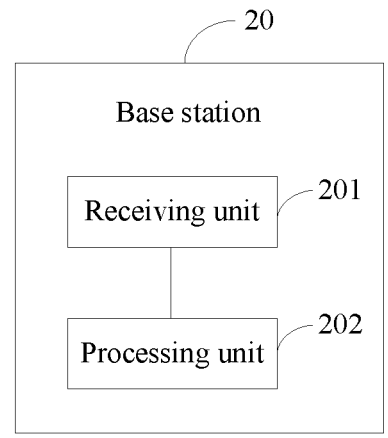
FIG. 7 is schematic block diagram 1 of a structure of a base station according to Embodiment 5 of the present application.

In Embodiment 5, as shown in FIG. 7, the base station 20 includes:

a receiving unit 201, configured to receive a first message sent by a second base station, where the first message carries configuration information corresponding to a CSI-RS of each cell of at least one second cell; the at least one second cell is a cell of the second base station, and the second cell is determined by a PCI and the CSI-RS; and a processing unit 202, configured to select, according to at least the first message received by the receiving unit 201, a cell of the at least one second cell to add to an uplink CoMP set of first UE served by a first cell, where the first cell is a cell of the base station.

Figure 8:
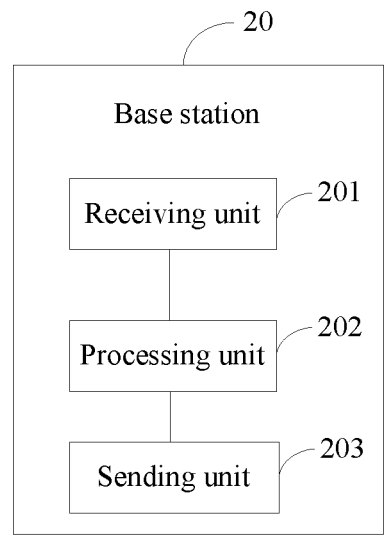
FIG. 8 is schematic block diagram 2 of a structure of a base station according to Embodiment 5 of the present application.

In Example 1, as shown in FIG. 8, the base station 20 includes:

the receiving unit 201, configured to receive the first message sent by the second base station, where the first message carries the configuration information corresponding to the CSI-RS of each of the at least one second cell; and a sending unit 203, configured to send, to multiple first UEs served by the first cell, the configuration information corresponding to the CSI-RS of each of the at least one second cell.

In this case, the receiving unit 201 is further configured to receive power information that is obtained through measurement by the multiple first UEs according to the configuration information and that is corresponding to the CSI-RS of the cell of the at least one second cell; and the processing unit 202 is specifically configured to instruct the sending unit 203 to send, to the multiple first UEs, the configuration information corresponding to the CSI-RS of each of the at least one second cell; the processing unit 202 is further specifically configured to: determine average receive power from the first cell to the cell of the at least one second cell according to at least the receive power information received by the receiving unit 201; and select, according to the average receive power, the cell of the at least one second cell to add to the uplink CoMP set of the first cell.

Further, the processing unit 202 is specifically configured to select, according to the average receive power and a preset rule, the cell of the at least one second cell to add to the uplink CoMP set of the first cell.

The preset rule may be setting a threshold that is referred to as a fifth preset threshold herein; that is, for each second cell of the at least one second cell, when the average receive power from the first cell to the second cell is greater than the fifth preset threshold, adding the second cell to the uplink CoMP set of the first cell.

Alternatively, the preset rule may further be: sorting the average receive power from the first cell to the cell of the at least one second cell, and selecting second cells corresponding to a preset quantity of greatest average receive power to add to the uplink CoMP set of the first cell.

In Example 2, referring to FIG. 8, the base station 20 includes:

the receiving unit 201, configured to receive the first message sent by the second base station, where the first message carries the configuration information corresponding to the CSI-RS of each of the at least one second cell; and a sending unit 203, configured to send, to multiple first UEs, the configuration information corresponding to the CSI-RS of each of the at least one second cell.

In this case, the receiving unit 201 is further configured to receive power information that is obtained through measurement by the multiple first UEs according to the configuration information and that is corresponding to the CSI-RS of the cell of the at least one second cell; and the processing unit 202 is specifically configured to instruct the sending unit 203 to send, to the multiple first UEs, the configuration information corresponding to the CSI-RS of each of the at least one second cell; when the first message received by the receiving unit 201 further carries transmit power information corresponding to the CSI-RS of each of the at least one second cell, the processing unit 202 is further specifically configured to: determine a normalized path loss from the first cell to the cell of the at least one second cell according to the transmit power information corresponding to the CSI-RS of each of the at least one second cell and the receive power information that is obtained through measurement by the multiple first UEs and that is corresponding to the CSI-RS of the cell of the at least one second cell; and select, according to at least the normalized path loss from the first cell to the cell of the at least one second cell, the cell of the at least one second cell to add to the uplink CoMP set of the first cell.

Further, the processing unit 202 is specifically configured to select, according to the normalized path loss from the first cell to the cell of the at least one second cell and a preset rule, the cell of the at least one second cell to add to the uplink CoMP set of the first cell.

The preset rule may be setting a threshold that is referred to as a sixth preset threshold herein; that is, for each of the at least one second cell, when the normalized path loss from the first cell to the second cell is less than the sixth preset threshold, adding the second cell to the uplink CoMP set of the first cell.

Alternatively, the preset rule may further be: sorting the normalized path loss from the first cell to the cell of the at least one second cell, and selecting second cells corresponding to a preset quantity of the smallest normalized path losses to add to the uplink CoMP set of the first cell.

Alternatively, the preset rule may further be setting a threshold that is referred to as a seventh preset threshold herein; that is, for each of the at least one second cell, when the normalized weighted path loss from the first cell to the second cell is less than the seventh preset threshold, adding the second cell to the uplink CoMP set of the first cell.

Alternatively, the preset rule may further be: sorting the normalized weighted path loss from the first cell to the cell of the at least one second cell, and selecting second cells corresponding to a preset quantity of smallest normalized weighted path losses to add to the uplink CoMP set of the first cell.

In Example 3, referring to FIG. 8, the base station includes:

the receiving unit 201, configured to receive the first message sent by the second base station, where the first message carries the configuration information corresponding to the CSI-RS of each of the at least one second cell; and a sending unit 203, configured to send, to multiple first UEs, the configuration information corresponding to the CSI-RS of each of the at least one second cell.

In this case, the receiving unit 201 is further configured to receive power information that is obtained through measurement by the multiple first UEs according to the configuration information and that is corresponding to the CSI-RS of the cell of the at least one second cell; and the processing unit 202 is specifically configured to instruct the sending unit 203 to send, to the multiple first UEs, the configuration information corresponding to the CSI-RS of each of the at least one second cell; when the first message received by the receiving unit 201 further carries transmit power information corresponding to the CSI-RS of each of the at least one second cell, the processing unit 202 is further specifically configured to determine a normalized path loss from the first cell to the cell of the at least one second cell according to the transmit power information corresponding to the CSI-RS of each of the at least one second cell and the receive power information that is obtained through measurement by the multiple first UEs and that is corresponding to the CSI-RS of the cell of the at least one second cell.

Further, the sending unit 203 is further configured to send, to the second base station, transmit power information corresponding to a CSI-RS of the first cell and configuration information corresponding to the CSI-RS of the first cell; and the receiving unit 201 is further configured to receive a normalized path loss from the at least one second cell to the first cell sent by the second base station, where the normalized path loss from the at least one second cell to the first cell is determined by the second base station according to at least the transmit power information corresponding to the CSI-RS of the first cell and the configuration information corresponding to the CSI-RS of the first cell.

The normalized path loss from the at least one second cell to the first cell includes a normalized weighted path loss from the at least one second cell to the first cell.

The processing unit 202 is specifically configured to: instruct the sending unit 203 to send, to the second base station, the transmit power information corresponding to the CSI-RS of the first cell and the configuration information corresponding to the CSI-RS of the first cell; and select, according to the normalized path loss from the first cell to the cell of the at least one second cell and the normalized path loss from the at least one second cell to the first cell, the cell of the at least one second cell to add to the uplink CoMP set of the first cell.

Further, the processing unit 202 is specifically configured to select, according to the normalized path loss from the first cell to the cell of the at least one second cell, the normalized path loss from the at least one second cell to the first cell, and a preset rule, the cell of the at least one second cell to add to the uplink CoMP set of the first cell.

The preset rule may be setting a threshold that is referred to as an eighth preset threshold herein; that is, for each of the at least one second cell, multiplying the normalized path loss from the first cell to the second cell by the normalized path loss from the second cell to the first cell, where a result is referred to as a third multiplying result; and when the third multiplying result is less than the eighth preset threshold, adding the second cell corresponding to the third multiplying result to the uplink CoMP set of the first cell.

Alternatively, the preset rule may further be: for each of the at least one second cell, sorting a third multiplying result obtained by multiplying the normalized path loss from the first cell to the second cell by the normalized path loss from the second cell to the first cell, and adding second cells corresponding to a preset quantity of smallest third multiplying results to the uplink CoMP set of the first cell.

Alternatively, the preset rule may further be setting a threshold that is referred to as a ninth preset threshold herein; that is, for each of the at least one second cell, multiplying the normalized weighted path loss from the first cell to the second cell by the normalized weighted path loss from the second cell to the first cell, where a result is referred to as a fourth multiplying result; and when the fourth multiplying result is less than the ninth preset threshold, adding the second cell corresponding to the fourth multiplying result to the uplink CoMP set of the first cell.

Alternatively, the preset rule may further be: for each of the at least one second cell, sorting a fourth multiplying result obtained by multiplying the normalized weighted path loss from the first cell to the second cell by the normalized weighted path loss from the second cell to the first cell, and adding second cells corresponding to a preset quantity of smallest fourth multiplying results to the uplink CoMP set of the first cell.

In this example, descriptions are given by using an example in which the normalized path loss from the first cell to the second cell is multiplied by the normalized path loss from the second cell to the first cell, or the normalized weighted path loss from the first cell to the second cell is multiplied by the normalized weighted path loss from the second cell to the first cell. However, this embodiment of the present application is not limited thereto, and the normalized path loss from the first cell to the second cell may be multiplied by the normalized weighted path loss from the second cell to the first cell, or the normalized weighted path loss from the first cell to the second cell may be multiplied by the normalized path loss from the second cell to the first cell.

It should be noted that for the foregoing base station 20, in terms of hardware implementation, the sending unit 203 may be a transmitter or a transceiver, the receiving unit 201 may be a receiver or a transceiver, and the sending unit 203 and the receiving unit 201 may be integrated to form a transceiver unit, and corresponding to hardware, are implemented as a transceiver. The processing unit 202 may, in hardware form, be embedded in or be independent from a processor of the base station, or may, in software form, be stored in a memory of the base station, so as to be called by the processor to execute operations corresponding to the foregoing modules. The processor may be a central processing unit (CPU), a microprocessor, a single-chip microcomputer, or the like.

This embodiment of the present application provides a base station. A receiving unit receives configuration information, sent by a second base station, corresponding to a CSI-RS of each cell of at least one second cell, so that, in a first aspect, a processing unit can obtain, according to the configuration information corresponding to the CSI-RS of each of the at least one second cell, receive power information that is obtained through measurement by multiple first UEs served by a first cell and that is corresponding to the CSI-RS of a cell of the at least one second cell, further obtain average receive power from the first cell to the cell of the at least one second cell, and determine, according to the average receive power, whether to add the at least one second cell to an uplink CoMP set of the first cell; in a second aspect, a processing unit can obtain a normalized path loss from a first cell to a cell of the at least one second cell according to transmit power information and the configuration information that are corresponding to the CSI-RS of each of the at least one second cell, and determine, according to the normalized path loss, whether to add the at least one second cell to an uplink CoMP set of the first cell; or in a third aspect, a processing unit controls a sending unit to send, to the second base station, transmit power information and configuration information that are corresponding to a CSI-RS of a first cell, and determines, according to a normalized path loss, received by the receiving unit, from the at least one second cell to the first cell sent by the second base station and a normalized path loss from the first cell to a cell of the at least one second cell, whether to add the cell of the at least one second cell to an uplink CoMP set of the first cell.

Another embodiment of the present application provides a base station 30, where the base station 30 is corresponding to the first base station in the uplink CoMP set selecting method provided by Embodiment 3; therefore, detailed descriptions of units may be the descriptions of the foregoing steps, and are not described herein again.

Figure 9:
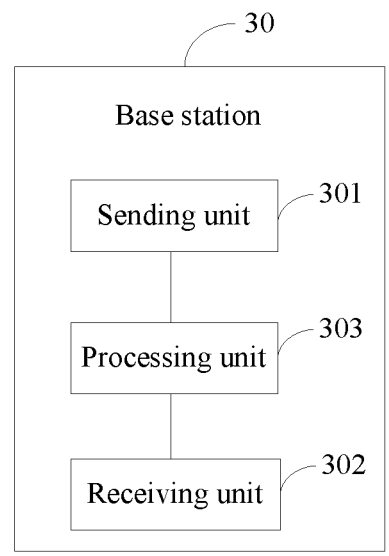
FIG. 9 is a schematic block diagram of a structure of a base station according to Embodiment 6 of the present application.

In Embodiment 6, as shown in FIG. 9, the base station 30 includes:

a sending unit 301, configured to send, to a second base station, transmit power information corresponding to a CSI-RS of a first cell and configuration information corresponding to the CSI-RS of the first cell, where the first cell is a cell of the base station, and the first cell is determined by a physical cell identifier PCI and the CSI-RS;

a receiving unit 302, configured to receive a normalized path loss from at least one second cell to the first cell sent by the second base station, where the normalized path loss from the at least one second cell to the first cell is determined by the second base station according to at least the transmit power information corresponding to the CSI-RS of the first cell and the configuration information corresponding to the CSI-RS of the first cell; the at least one second cell is a cell of the second base station, and a cell of the at least one second cell is determined by a PCI and the CSI-RS; and a processing unit 303, configured to instruct the sending unit 301 to send, to the second base station, the transmit power information corresponding to the CSI-RS of the first cell and the configuration information corresponding to the CSI-RS of the first cell; and select, according to at least the normalized path loss from the at least one second cell to the first cell received by the receiving unit 302, a cell of the at least one second cell to add to an uplink CoMP set of the first cell.

Further, the processing unit 303 is specifically configured to select, according to the normalized path loss from the at least one second cell to the first cell received by the receiving unit 302 and a preset rule, the cell of the at least one second cell to add to the uplink CoMP set of the first cell.

The preset rule may be setting a threshold that is referred to as a tenth preset threshold herein; that is, for each of the at least one second cell, when the normalized path loss from the second cell to the first cell is less than the tenth preset threshold, adding the second cell to the uplink CoMP set of the first cell.

Alternatively, the preset rule may further be: sorting the normalized path loss from the at least one second cell to the first cell, and adding second cells corresponding to a preset quantity of the smallest normalized path losses to the uplink CoMP set of the first cell.

Alternatively, the preset rule may further be setting a threshold that is referred to as an eleventh preset threshold herein; that is, for each of the at least one second cell, when a normalized weighted path loss from the second cell to the first cell is less than the eleventh preset threshold, adding the second cell to the uplink CoMP set of the first cell.

Alternatively, the preset rule may further be: sorting a normalized weighted path loss from the at least one second cell to the first cell, and adding second cells corresponding to a preset quantity of smallest normalized weighted path losses to the uplink CoMP set of the first cell.

It should be noted that for the foregoing base station 30, in terms of hardware implementation, the sending unit 301 may be a transmitter or a transceiver, the receiving unit 302 may be a receiver or a transceiver, and the sending unit 301 and the receiving unit 302 may be integrated to form a transceiver unit, and corresponding to hardware, are implemented as a transceiver. The processing unit 303 may, in hardware form, be embedded in or be independent from a processor of the base station, or may, in software form, be stored in a memory of the base station, so as to be called by the processor to execute operations corresponding to the foregoing modules. The processor may be a central processing unit (CPU), a microprocessor, a single-chip microcomputer, or the like.

This embodiment of the present application provides a base station. A sending unit sends, to a second base station, transmit power information and configuration information that are corresponding to a CSI-RS of a first cell, so that the second base station obtains a normalized path loss from the at least one second cell to the first cell, and sends the normalized path loss to a receiving unit; a processing unit determines, according to the normalized path loss, whether to add a cell of the at least one second cell to an uplink CoMP set of the first cell.

An embodiment of the present application provides a base station 40, where the base station 40 is corresponding to the first base station in the uplink CoMP set selecting method provided by Embodiment 1; therefore, detailed descriptions of devices may be the descriptions of the foregoing steps, and are not described herein again.

Figure 10:
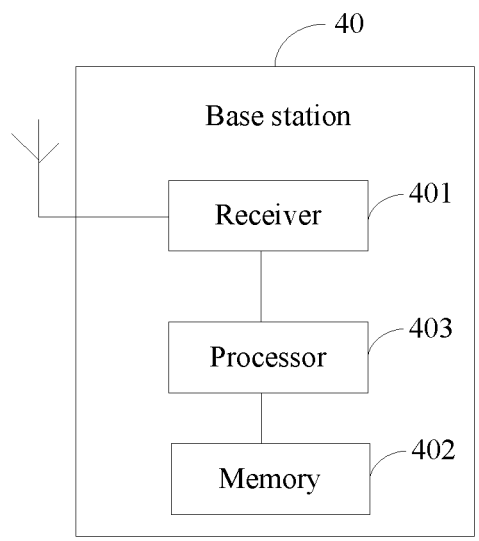
FIG. 10 is schematic block diagram 1 of a structure of a base station according to Embodiment 7 of the present application.

In Embodiment 7, as shown in FIG. 10, FIG. 10 is a schematic structural diagram of the base station 40 provided by this embodiment of the present application, and the base station 40 includes: a receiver 401, a memory 402, and a processor 403 that is connected to the receiver 401 and the memory 402 separately. Certainly, the base station 40 may further include common components such as an antenna, a baseband processing component, an intermediate and radio frequency processing component, an input and output apparatus, and the like; this embodiment of the present application imposes no limitation herein.

The receiver 401 is configured to receive a first message sent by a second base station, where the first message carries configuration information corresponding to a CSI-RS of each cell of at least one second cell; the at least one second cell is a cell of the second base station, and a cell of the at least one second cell is determined by a PCI and the CSI-RS.

The memory 402 is configured to store program code; the processor 403 is configured to execute the code, where the code includes: controlling, by the processor 403, the receiver 401 to receive the first message; and selecting, by the processor 403 according to at least the first message, a cell of the at least one second cell to add to an uplink CoMP set of first UE served by a first cell, where the first cell is a cell of the base station.

Figure 11:
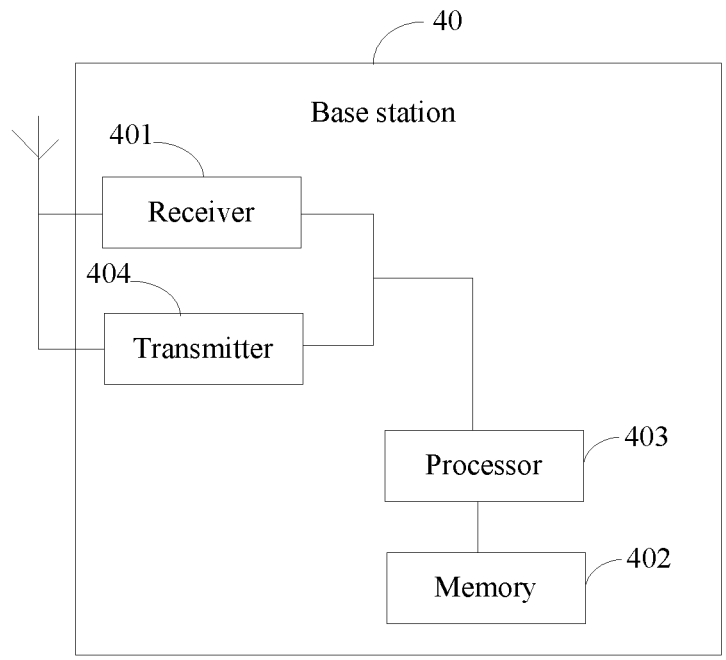
FIG. 11 is schematic block diagram 2 of a structure of a base station according to Embodiment 7 of the present application.

In Example 1, as shown in FIG. 11, FIG. 11 is a schematic structural diagram of the base station 40 provided by this embodiment of the present application, and the base station 40 includes: the receiver 401, the memory 402, a transmitter 404, and the processor 403 that is connected to the receiver 401, the memory 402, and the transmitter 404 separately.

The receiver 401 is configured to receive the first message sent by the second base station, where the first message carries the configuration information corresponding to the CSI-RS of each of the at least one second cell.

The transmitter 404 is configured to send, to the first UE, the configuration information corresponding to the CSI-RS of each of the at least one second cell.

In this case, the receiver 401 is further configured to receive power information that is obtained through measurement by the first UE according to the configuration information and that is corresponding to the CSI-RS of the cell of the at least one second cell.

The memory 402 is configured to store the program code; the processor 403 is configured to execute the code, where the code includes: controlling, by the processor 403, the receiver 401 to receive the first message; controlling, by the processor 403, the transmitter 404 to send, to the first UE, the configuration information corresponding to the CSI-RS of each of the at least one second cell; and when the receiver 401 further receives the receive power information that is obtained through measurement by the first UE according to the configuration information and that is corresponding to the CSI-RS of the cell of the at least one second cell, selecting, according to at least the receive power information, the cell of the at least one second cell to add to the uplink CoMP set of the first UE.

Further, the processor 403 is specifically configured to select, according to the receive power information and a preset rule, the at least one second cell to add to the uplink CoMP set of the first UE.

The preset rule is the same as that in Example 1 of Embodiment 1, and is not described herein again.

In Example 2, referring to FIG. 11, the base station 40 includes: the receiver 401, the memory 402, a transmitter 404, and the processor 403 that is connected to the receiver 401, the memory 402, and the transmitter 404 separately.

The receiver 401 is configured to receive the first message sent by the second base station, where the first message carries the configuration information corresponding to the CSI-RS of each of the at least one second cell.

The transmitter 404 is configured to send, to the first UE, the configuration information corresponding to the CSI-RS of each of the at least one second cell.

In this case, the receiver 401 is further configured to receive power information that is obtained through measurement by the first UE according to the configuration information and that is corresponding to the CSI-RS of the cell of the at least one second cell.

The memory 402 is configured to store the program code; the processor 403 is configured to execute the code, where the code includes: controlling, by the processor 403, the receiver 401 to receive the first message; controlling, by the processor 403, the transmitter 404 to send, to the first UE, the configuration information corresponding to the CSI-RS of each of the at least one second cell; and when the receiver 401 further receives the receive power information that is obtained through measurement by the first UE according to the configuration information and that is corresponding to the CSI-RS of the cell of the at least one second cell, and when the first message further carries transmit power information corresponding to the CSI-RS of each of the at least one second cell, determining a path loss from the first UE to the cell of the at least one second cell according to the transmit power information corresponding to the CSI-RS of each of the at least one second cell and the receive power information that is obtained through measurement by the first UE and that is corresponding to the CSI-RS of the cell of the at least one second cell, and selecting, according to at least the path loss from the first UE to the cell of the at least one second cell, the cell of the at least one second cell to add to the uplink CoMP set of the first UE.

Herein, the processor 403 is specifically configured to select, according to the path loss from the first UE to the cell of the at least one second cell and a preset rule, the cell of the at least one second cell to add to the uplink CoMP set of the first UE.

The preset rule is the same as that in Example 2 of Embodiment 1 of the foregoing method, and is not described herein again.

In Example 3, referring to FIG. 11, the base station 40 includes: the receiver 401, the memory 402, a transmitter 404, and the processor 403 that is connected to the receiver 401, the memory 402, and the transmitter 404 separately.

The receiver 401 is configured to receive the first message sent by the second base station, where the first message carries the configuration information corresponding to the CSI-RS of each of the at least one second cell.

The transmitter 404 is configured to send, to the first UE, the configuration information corresponding to the CSI-RS of each of the at least one second cell.

In this case, the receiver 401 is further configured to receive power information that is obtained through measurement by the first UE according to the configuration information and that is corresponding to the CSI-RS of the cell of the at least one second cell.

The memory 402 is configured to store the program code; the processor 403 is configured to execute the code, where the code includes: controlling, by the processor 403, the receiver 401 to receive the first message; controlling, by the processor 403, the transmitter 404 to send, to the first UE, the configuration information corresponding to the CSI-RS of each of the at least one second cell; and when the receiver 401 further receives the receive power information that is obtained through measurement by the first UE according to the configuration information and that is corresponding to the CSI-RS of the cell of the at least one second cell, and when the first message further carries transmit power information corresponding to the CSI-RS of each of the at least one second cell, determining a path loss from the first UE to the cell of the at least one second cell according to the transmit power information corresponding to the CSI-RS of each of the at least one second cell and the receive power information that is obtained through measurement by the first UE and that is corresponding to the CSI-RS of the cell of the at least one second cell.

Further, the transmitter 404 is further configured to send, to the second base station, transmit power information corresponding to a CSI-RS of the first cell and configuration information corresponding to the CSI-RS of the first cell, where the first cell is determined by a PCI and the CSI-RS.

The receiver 401 is further configured to receive a normalized path loss from the at least one second cell to the first cell sent by the second base station, where the normalized path loss from the at least one second cell to the first cell is determined by the second base station according to at least the transmit power information corresponding to the CSI-RS of the first cell and the configuration information corresponding to the CSI-RS of the first cell.

The processor 403 is further configured to: when the receiver 401 receives the normalized path loss from the at least one second cell to the first cell sent by the second base station, select, according to at least the path loss from the first UE to the cell of the at least one second cell and the normalized path loss from the at least one second cell to the first cell, the cell of the at least one second cell to add to the uplink CoMP set of the first UE.

Further, the processor 403 is specifically configured to select, according to the path loss from the first UE to the cell of the at least one second cell, the normalized path loss from the at least one second cell to the first cell, and a preset rule, the cell of the at least one second cell to add to the uplink CoMP set of the first UE.

The preset rule is the same as that in Example 3 of Embodiment 1 of the foregoing method, and is not described herein again.

This embodiment of the present application provides a base station. A receiver receives configuration information, sent by a second base station, corresponding to a CSI-RS of each cell of at least one second cell, so that, in a first aspect, a processor can obtain, according to the configuration information corresponding to the CSI-RS of each of the at least one second cell, receive power information that is obtained through measurement by first UE served by a first cell and that is corresponding to the CSI-RS of a cell of the at least one second cell, and determine, according to the receive power information, whether to add the cell of the at least one second cell to an uplink CoMP set of the first UE; in a second aspect, a processor can obtain a path loss from first UE to a cell of the at least one second cell according to transmit power information corresponding to the CSI-RS of each of the at least one second cell, and determine, according to the path loss, whether to add the at least one second cell to an uplink CoMP set of the first UE; or in a third aspect, a processor controls a transmitter to send, to the second base station, transmit power information and configuration information that are corresponding to a CSI-RS of a first cell, and determines, according to a normalized path loss, received by the receiver, from the at least one second cell to the first cell sent by the second base station and a path loss from first UE to a cell of the at least one second cell, whether to add the cell of the at least one second cell to an uplink CoMP set of the first UE.

An embodiment of the present application provides a base station 50, where the base station 50 is corresponding to the first base station in the uplink CoMP set selecting method provided by Embodiment 2; therefore, detailed descriptions of devices may be the descriptions of the foregoing steps, and are not described herein again.

Figure 12:
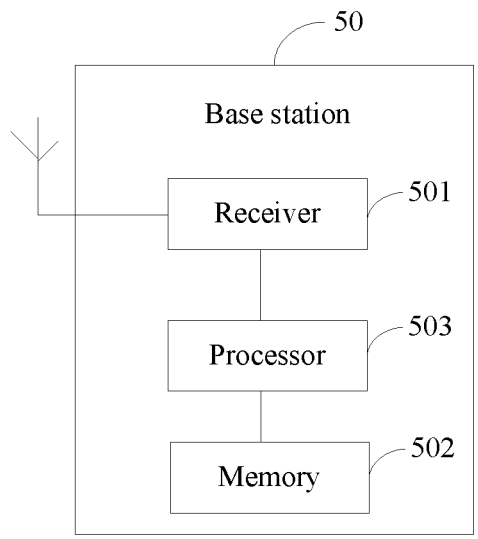
FIG. 12 is schematic block diagram 1 of a structure of a base station according to Embodiment 8 of the present application.

In Embodiment 8, as shown in FIG. 12, FIG. 12 is a schematic structural diagram of the base station 50 provided by this embodiment of the present application, and the base station 50 includes: a receiver 501, a memory 502, and a processor 503 that is connected to the receiver 501 and the memory 502 separately. Certainly, the base station 50 may further include common components such as an antenna, a baseband processing component, an intermediate and radio frequency processing component, an input and output apparatus, and the like; this embodiment of the present application imposes no limitation herein.

The receiver 501 is configured to receive a first message sent by a second base station, where the first message carries configuration information corresponding to a CSI-RS of each cell of at least one second cell; the at least one second cell is a cell of the second base station, and a cell of the at least one second cell is determined by a PCI and the CSI-RS.

The memory 502 is configured to store program code; the processor 503 is configured to execute the code, where the code includes: controlling, by the processor 503, the receiver 501 to receive the first message; and selecting, by the processor 503 according to at least the first message, a cell of the at least one second cell to add to an uplink CoMP set of a first cell, where the first cell is a cell of the base station.

Figure 13:
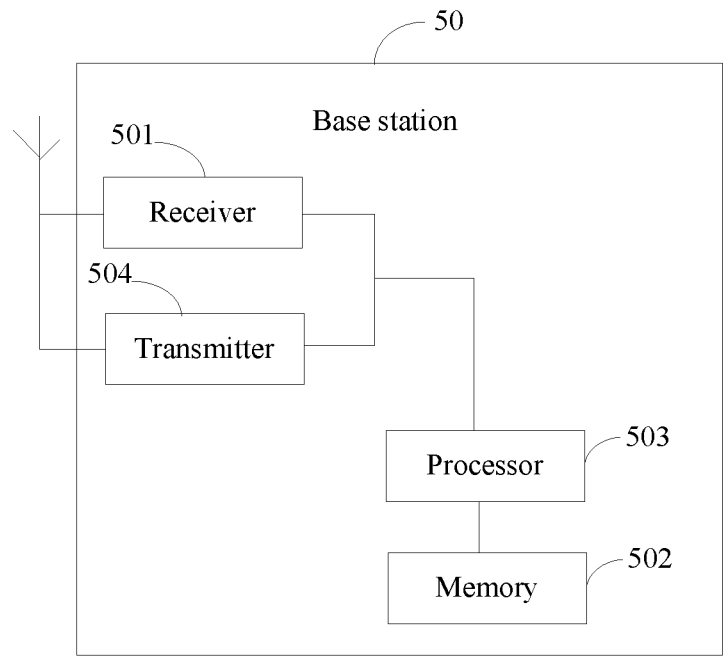
FIG. 13 is schematic block diagram 2 of a structure of a base station according to Embodiment 8 of the present application.

In Example 1, as shown in FIG. 13, FIG. 13 is a schematic structural diagram of the base station 50 provided by this embodiment of the present application, and the base station 50 includes: the receiver 501, the memory 502, a transmitter 504, and the processor 503 that is connected to the receiver 501, the memory 502, and the transmitter 504 separately.

The receiver 501 is configured to receive the first message sent by the second base station, where the first message carries the configuration information corresponding to the CSI-RS of each of the at least one second cell.

The transmitter 504 is configured to send, to multiple first UEs served by the first cell, the configuration information corresponding to the CSI-RS of each of the at least one second cell.

In this case, the receiver 501 is further configured to receive power information that is obtained through measurement by the multiple first UEs according to the configuration information and that is corresponding to the CSI-RS of the cell of the at least one second cell.

The memory 502 is configured to store the program code; the processor 503 is configured to execute the code, where the code includes: controlling, by the processor 503, the receiver 501 to receive the first message; controlling, by the processor 503, the transmitter 504 to send, to the multiple first UEs served by the first cell, the configuration information corresponding to the CSI-RS of each of the at least one second cell; and when the receiver 501 further receives the receive power information that is obtained through measurement by the multiple first UEs according to the configuration information and that is corresponding to the CSI-RS of the cell of the at least one second cell, determining average receive power from the first cell to the cell of the at least one second cell according to at least the receive power information, and selecting, according to the average receive power, the cell of the at least one second cell to add to the uplink CoMP set of the first cell.

Further, the processor 503 is specifically configured to select, according to the average receive power and a preset rule, the cell of the at least one second cell to add to the uplink CoMP set of the first cell.

The preset rule is the same as that in Example 1 of Embodiment 2 of the foregoing method, and is not described herein again.

In Example 2, referring to FIG. 13, FIG. 13 is a schematic structural diagram of the base station 50 provided by this embodiment of the present application, and the base station 50 includes: the receiver 501, the memory 502, a transmitter 504, and the processor 503 that is connected to the receiver 501, the memory 502, and the transmitter 504 separately.

The receiver 501 is configured to receive the first message sent by the second base station, where the first message carries the configuration information corresponding to the CSI-RS of each of the at least one second cell.

The transmitter 504 is configured to send, to multiple first UEs served by the first cell, the configuration information corresponding to the CSI-RS of each of the at least one second cell.

In this case, the receiver 501 is further configured to receive power information that is obtained through measurement by the multiple first UEs according to the configuration information and that is corresponding to the CSI-RS of the cell of the at least one second cell.

The memory 502 is configured to store the program code; the processor 503 is configured to execute the code, where the code includes: controlling, by the processor 503, the receiver 501 to receive the first message; controlling, by the processor 503, the transmitter 504 to send, to the multiple first UEs served by the first cell, the configuration information corresponding to the CSI-RS of each of the at least one second cell; and when the receiver 501 further receives the receive power information that is obtained through measurement by the multiple first UEs according to the configuration information and that is corresponding to the CSI-RS of the cell of the at least one second cell, and when the first message further carries transmit power information corresponding to the CSI-RS of each of the at least one second cell, determining a normalized path loss from the first cell to the cell of the at least one second cell according to the transmit power information corresponding to the CSI-RS of each of the at least one second cell and the receive power information that is obtained through measurement by the multiple first UEs and that is corresponding to the CSI-RS of the cell of the at least one second cell, and selecting, according to at least the normalized path loss from the first cell to the cell of the at least one second cell, the cell of the at least one second cell to add to the uplink CoMP set of the first cell.

Further, the processor 503 is specifically configured to select, according to the normalized path loss from the first cell to the cell of the at least one second cell and a preset rule, the cell of the at least one second cell to add to the uplink CoMP set of the first cell.

The preset rule is the same as that in Example 2 of Embodiment 2 of the foregoing method, and is not described herein again.

In Example 3, referring to FIG. 13, FIG. 13 is a schematic structural diagram of the base station 50 provided by this embodiment of the present application, and the base station 50 includes: the receiver 501, the memory 502, a transmitter 504, and the processor 503 that is connected to the receiver 501, the memory 502, and the transmitter 504 separately.

The receiver 501 is configured to receive the first message sent by the second base station, where the first message carries the configuration information corresponding to the CSI-RS of each of the at least one second cell.

The transmitter 504 is configured to send, to multiple first UEs served by the first cell, the configuration information corresponding to the CSI-RS of each of the at least one second cell.

In this case, the receiver 501 is further configured to receive power information that is obtained through measurement by the multiple first UEs according to the configuration information and that is corresponding to the CSI-RS of the cell of the at least one second cell.

The memory 502 is configured to store the program code; the processor 503 is configured to execute the code, where the code includes: controlling, by the processor 503, the receiver 501 to receive the first message; controlling, by the processor 503, the transmitter 504 to send, to the multiple first UEs served by the first cell, the configuration information corresponding to the CSI-RS of each of the at least one second cell; and when the receiver 501 further receives the receive power information that is obtained through measurement by the multiple first UEs according to the configuration information and that is corresponding to the CSI-RS of the cell of the at least one second cell, and when the first message further carries transmit power information corresponding to the CSI-RS of each of the at least one second cell, determining a normalized path loss from the first cell to the cell of the at least one second cell according to the transmit power information corresponding to the CSI-RS of each of the at least one second cell and the receive power information that is obtained through measurement by the multiple first UEs and that is corresponding to the CSI-RS of the cell of the at least one second cell.

Further, the transmitter 504 is further configured to send, to the second base station, transmit power information corresponding to a CSI-RS of the first cell and configuration information corresponding to the CSI-RS of the first cell.

In this case, the receiver 501 is further configured to receive a normalized path loss from the at least one second cell to the first cell sent by the second base station, where the normalized path loss from the at least one second cell to the first cell is determined by the second base station according to at least the transmit power information corresponding to the CSI-RS of the first cell and the configuration information corresponding to the CSI-RS of the first cell.

The processor 503 is further configured to: control the transmitter 504 to send, to the second base station, the transmit power information corresponding to the CSI-RS of the first cell and the configuration information corresponding to the CSI-RS of the first cell; when the receiver 501 further receives the normalized path loss from the at least one second cell to the first cell sent by the second base station, select, according to the normalized path loss from the first cell to the cell of the at least one second cell and the normalized path loss from the at least one second cell to the first cell, the cell of the at least one second cell to add to the uplink CoMP set of the first cell.

Further, the processor 503 is specifically configured to select, according to the normalized path loss from the first cell to the cell of the at least one second cell, the normalized path loss from the at least one second cell to the first cell, and a preset rule, the cell of the at least one second cell to add to the uplink CoMP set of the first cell.

The preset rule is the same as that in Example 3 of Embodiment 2 of the foregoing method, and is not described herein again.

This embodiment of the present application provides a base station. A receiver receives configuration information, sent by a second base station, corresponding to a CSI-RS of each cell of at least one second cell, so that, in a first aspect, a processor can obtain, according to the configuration information corresponding to the CSI-RS of each of the at least one second cell, receive power information that is obtained through measurement by multiple first UEs served by a first cell and that is corresponding to the CSI-RS of a cell of the at least one second cell, further obtain average receive power from the first cell to the cell of the at least one second cell, and determine, according to the average receive power, whether to add the cell of the at least one second cell to an uplink CoMP set of the first cell; in a second aspect, a processor can obtain a normalized path loss from a first cell to a cell of the at least one second cell according to transmit power information and the configuration information that are corresponding to the CSI-RS of each of the at least one second cell, and determine, according to the normalized path loss, whether to add the cell of the at least one second cell to an uplink CoMP set of the first cell; or in a third aspect, a processor controls a transmitter to send, to the second base station, transmit power information and configuration information that are corresponding to a CSI-RS of a first cell, and determines, according to a normalized path loss, received by the receiver, from the at least one second cell to the first cell sent by the second base station and a normalized path loss from the first cell to a cell of the at least one second cell, whether to add the cell of the at least one second cell to an uplink CoMP set of the first cell.

An embodiment of the present application provides a base station 60, where the base station 60 is corresponding to the first base station in the uplink CoMP set selecting method provided by Embodiment 3; therefore, detailed descriptions of devices may be the descriptions of the foregoing steps, and are not described herein again.

Figure 14:
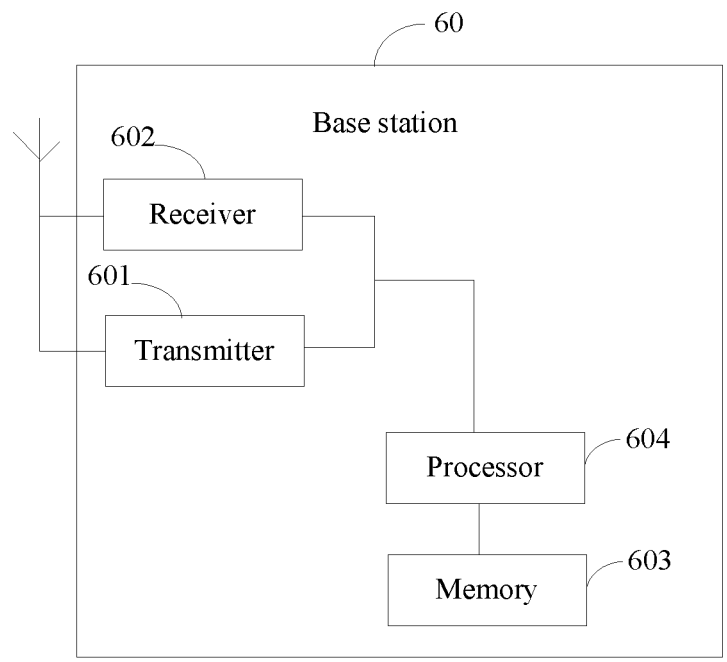
FIG. 14 is a schematic block diagram of a structure of a base station according to Embodiment 9 of the present application.

In Embodiment 9, as shown in FIG. 14, FIG. 14 is a schematic structural diagram of the base station 60 provided by this embodiment of the present application, and the base station 60 includes: a transmitter 601, a receiver 602, a memory 603, and a processor 604 that is connected to the transmitter 601, the receiver 602, and the memory 603 separately. Certainly, the base station 60 may further include common components such as an antenna, a baseband processing component, an intermediate and radio frequency processing component, an input and output apparatus, and the like; this embodiment of the present application imposes no limitation herein.

The transmitter 601 is configured to send, to a second base station, transmit power information corresponding to a channel state information-reference signal CSI-RS of a first cell and configuration information corresponding to the CSI-RS of the first cell, where the first cell is a cell of the base station, and the first cell is determined by a PCI and the CSI-RS.

The receiver 602 is configured to receive a normalized path loss from at least one second cell to the first cell sent by the second base station, where the normalized path loss from the at least one second cell to the first cell is determined by the second base station according to at least the transmit power information corresponding to the CSI-RS of the first cell and the configuration information corresponding to the CSI-RS of the first cell; the at least one second cell is a cell of the second base station, and a cell of the at least one second cell is determined by a PCI and the CSI-RS.

The memory 603 is configured to store program code; the processor 604 is configured to execute the code, where the code includes: controlling, by the processor 604, the transmitter 601 to send, to the second base station, the transmit power information corresponding to the CSI-RS of the first cell and the configuration information corresponding to the CSI-RS of the first cell; and selecting, according to at least the normalized path loss from the at least one second cell to the first cell received by the receiver 602, a cell of the at least one second cell to add to an uplink coordinated multipoint transmission CoMP set of the first cell.

Further, the processor 604 is specifically configured to select, according to the normalized path loss from the at least one second cell to the first cell received by the receiver 602 and a preset rule, the cell of the at least one second cell to add to the uplink CoMP set of the first cell.

The preset rule is the same as the preset rule in Embodiment 3 of the foregoing method, and is not described herein again.

This embodiment of the present application provides an uplink CoMP set selecting method. A transmitter sends, to a second base station, transmit power information and configuration information that are corresponding to a CSI-RS of a first cell, so that the second base station obtains a normalized path loss from the at least one second cell to the first cell, and sends the normalized path loss to a receiver; and a processor determines, according to the normalized path loss, whether to add a cell of the at least one second cell to an uplink CoMP set of the first cell. In various possible implementation manners of all the foregoing embodiments of the present application, various thresholds (for example, the first preset threshold to the eleventh preset threshold) may exist. A person skilled in the art can understand that during implementation of an actual project, these thresholds may be determined according to a policy of an operator, current system bandwidth or an available resource of a current system. For a specific method, refer to the prior art, and details are not described herein again.

The foregoing descriptions are merely specific implementation manners of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. An uplink coordinated multipoint transmission set selecting method, comprising:
   receiving, by a first base station, a first message sent by a second base station, wherein the first message carries configuration information corresponding to a channel state information-reference signal (CSI-RS) of each cell of at least one second cell; and
   selecting, by the first base station according to at least the first message, a cell of the at least one second cell to add to an uplink coordinated multipoint transmission (CoMP) set of first user equipment UE served by a first cell, wherein:
   the at least one second cell is a cell of the second base station, and the cell of the at least one second cell is determined by a physical cell identifier (PCI) and the CSI-RS; the first cell is a cell of the first base station, and wherein the selecting comprising:
      sending, by the first base station to the second base station, transmit power information corresponding to a CSI-RS of the first cell and configuration information corresponding to the CSI-RS of the first cell, wherein the first cell is determined by a PCI and the CSI-RS of the first cell;
      receiving, by the first base station, a normalized path loss from the at least one second cell to the first cell sent by the second base station, wherein the normalized path loss from the at least one second cell to the first cell is determined by the second base station according to at least the transmit power information corresponding to the CSI-RS of the first cell and the configuration information corresponding to the CSI-RS of the first cell; and
      selecting, by the first base station according to at least the path loss from the first UE to the cell of the at least one second cell and the normalized path loss from the at least one second cell to the first cell, the cell of the at least one second cell to add to the uplink CoMP set of the first UE.

2. The method according to claim 1, wherein the selecting, by the first base station according to at least the first message, a cell of the at least one second cell to add to an uplink CoMP set of first UE served by a first cell comprises:
   sending, by the first base station to the first UE, the configuration information corresponding to the CSI-RS of each of the at least one second cell;
   receiving, by the first base station, receive power information that is obtained through measurement by the first UE according to the configuration information and that is corresponding to the CSI-RS of the cell of the at least one second cell; and
   selecting, by the first base station according to at least the receive power information, the cell of the at least one second cell to add to the uplink CoMP set of the first UE.

3. An uplink coordinated multipoint transmission set selecting method, comprising:
   receiving, by a first base station, a first message sent by a second base station, wherein the first message carries configuration information corresponding to a channel state information-reference signal (CSI-RS) of each cell of at least one second cell; and
   selecting, by the first base station according to at least the first message, a cell of the at least one second cell to add to an uplink coordinated multipoint transmission (CoMP) set of first user equipment UE served by a first cell, wherein:
   the at least one second cell is a cell of the second base station, and the cell of the at least one second cell is determined by a physical cell identifier (PCI) and the CSI-RS; the first cell is a cell of the first base station, wherein the selecting, by the first base station according to at least the first message, a cell of the at least one second cell to add to an uplink CoMP set of first UE served by a first cell comprises:
      sending, by the first base station to the first UE, the configuration information corresponding to the CSI-RS of each of the at least one second cell;
      receiving, by the first base station, receive power information that is obtained through measurement by the first UE according to the configuration information and that is corresponding to the CSI-RS of the cell of the at least one second cell;
      when the first message further carries transmit power information corresponding to the CSI-RS of each of the at least one second cell, determining, by the first base station, a path loss from the first UE to the cell of the at least one second cell according to the transmit power information corresponding to the CSI-RS of each of the at least one second cell and the receive power information that is obtained through measurement by the first UE and that is corresponding to the CSI-RS of the cell of the at least one second cell; and
      selecting, by the first base station according to at least the path loss from the first UE to the cell of the at least one second cell, the cell of the at least one second cell to add to the uplink CoMP set of the first UE.

4. The method according to claim 3, wherein the selecting, by the first base station according to at least the path loss from the first UE to the cell of the at least one second cell, the cell of the at least one second cell to add to the uplink CoMP set of the first UE comprises:
   sending, by the first base station to the second base station, transmit power information corresponding to a CSI-RS of the first cell and configuration information corresponding to the CSI-RS of the first cell, wherein the first cell is determined by a PCI and the CSI-RS of the first cell;
   receiving, by the first base station, a normalized path loss from the at least one second cell to the first cell sent by the second base station, wherein the normalized path loss from the at least one second cell to the first cell is determined by the second base station according to at least the transmit power information corresponding to the CSI-RS of the first cell and the configuration information corresponding to the CSI-RS of the first cell; and selecting, by the first base station according to at least the path loss from the first UE to the cell of the at least one second cell and the normalized path loss from the at least one second cell to the first cell, the cell of the at least one second cell to add to the uplink CoMP set of the first UE.

5. An uplink coordinated multipoint transmission set selecting method, comprising:

receiving, by a first base station, a first message sent by a second base station, wherein the first message carries configuration information corresponding to a channel state information-reference signal (CSI-RS) of each cell of at least one second cell; and selecting, by the first base station according to at least the first message, a cell of the at least one second cell to add to an uplink coordinated multipoint transmission (CoMP) set of a first cell, wherein:

the at least one second cell is a cell of the second base station, and the cell of the at least one second cell is determined by a physical cell identifier (PCI) and the CSI-RS; the first cell is a cell of the first base station, and wherein the selecting comprising:

sending, by the first base station to the second base station, transmit power information corresponding to a CSI-RS of the first cell and configuration information corresponding to the CSI-RS of the first cell, wherein the first cell is determined by a PCI and the CSI-RS of the first cell;

receiving, by the first base station, a normalized path loss from the at least one second cell to the first cell sent by the second base station, wherein the normalized path loss from the at least one second cell to the first cell is determined by the second base station according to at least the transmit power information corresponding to the CSI-RS of the first cell and the configuration information corresponding to the CSI-RS of the first cell; and selecting, by the first base station according to the normalized path loss from the first cell to the cell of the at least one second cell and the normalized path loss from the at least one second cell to the first cell, the cell of the at least one second cell to add to the uplink CoMP set of the first cell.

6. The method according to claim 5, wherein the selecting, by the first base station according to at least the first message, a cell of the at least one second cell to add to an uplink CoMP set of a first cell comprises:

sending, by the first base station to multiple first user equipments (UEs) served by the first cell, the configuration information corresponding to the CSI-RS of each of the at least one second cell;

receiving, by the first base station, receive power information that is obtained through measurement by the multiple first UEs according to the configuration information and that is corresponding to the CSI-RS of the cell of the at least one second cell; and determining, by the first base station, average receive power from the first cell to the cell of the at least one second cell according to at least the receive power information, and selecting, according to at least the average receive power, the cell of the at least one second cell to add to the uplink CoMP set of the first cell.

7. An uplink coordinated multipoint transmission set selecting method, comprising:

receiving, by a first base station, a first message sent by a second base station, wherein the first message carries configuration information corresponding to a channel state information-reference signal (CSI-RS) of each cell of at least one second cell; and selecting, by the first base station according to at least the first message, a cell of the at least one second cell to add to an uplink coordinated multipoint transmission (CoMP) set of a first cell, wherein:

the at least one second cell is a cell of the second base station, and the cell of the at least one second cell is determined by a physical cell identifier (PCI) and the CSI-RS; the first cell is a cell of the first base station, wherein the selecting, by the first base station according to at least the first message, a cell of the at least one second cell to add to an uplink CoMP set of a first cell comprises:

sending, by the first base station to multiple first UEs, the configuration information corresponding to the CSI-RS of each of the at least one second cell;

receiving, by the first base station, receive power information that is obtained through measurement by the multiple first UEs according to the configuration information and that is corresponding to the CSI-RS of the cell of the at least one second cell;

when the first message further carries transmit power information corresponding to the CSI-RS of each of the at least one second cell, determining, by the first base station, a normalized path loss from the first cell to the cell of the at least one second cell according to the transmit power information corresponding to the CSI-RS of each of the at least one second cell and the receive power information that is obtained through measurement by the multiple first UEs and that is corresponding to the CSI-RS of the cell of the at least one second cell; and selecting, by the first base station according to at least the normalized path loss from the first cell to the cell of the at least one second cell, the cell of the at least one second cell to add to the uplink CoMP set of the first cell.

8. The method according to claim 7, wherein the selecting, by the first base station according to at least the normalized path loss from the first cell to the cell of the at least one second cell, the cell of the at least one second cell to add to the uplink CoMP set of the first cell comprises:

sending, by the first base station to the second base station, transmit power information corresponding to a CSI-RS of the first cell and configuration information corresponding to the CSI-RS of the first cell, wherein the first cell is determined by a PCI and the CSI-RS of the first cell;

receiving, by the first base station, a normalized path loss from the at least one second cell to the first cell sent by the second base station, wherein the normalized path loss from the at least one second cell to the first cell is determined by the second base station according to at least the transmit power information corresponding to the CSI-RS of the first cell and the configuration information corresponding to the CSI-RS of the first cell; and selecting, by the first base station according to the normalized path loss from the first cell to the cell of the at least one second cell and the normalized path loss from the at least one second cell to the first cell, the cell of the at least one second cell to add to the uplink CoMP set of the first cell.

9. A base station, comprising:
a receiver;
a memory;
a processor, wherein:
the receiver is configured to receive a first message sent by a second base station, wherein the first message carries configuration information corresponding to a channel state information-reference signal (CSI-RS) of each of at least one second cell;
the memory is configured to store program code; and
the processor is configured to execute the code, wherein the code comprises: controlling, by the processor, the receiver to receive the first message; and selecting, by the processor according to at least the first message, a cell of the at least one second cell to add to an uplink coordinated multipoint transmission (CoMP) set of first user equipment (UE) served by a first cell; and
a transmitter, configured to send, to the first UE, the configuration information corresponding to the CSI-RS of each of the at least one second cell,
wherein the at least one second cell is a cell of the second base station, and the cell of the at least one second cell is determined by a physical cell identifier PCI and the CSI-RS; the first cell is a cell of the first base station, and wherein the selecting comprising:
controlling the transmitter to send, to the second base station, transmit power information corresponding to a CSI-RS of the first cell and configuration information corresponding to the CSI-RS of the first cell; and
when the receiver receives a normalized path loss from the at least one second cell to the first cell sent by the second base station, selecting, according to at least the path loss from the first UE to the cell of the at least one second cell and the normalized path loss from the at least one second cell to the first cell, the cell of the at least one second cell to add to the uplink CoMP set of the first UE, wherein:
the transmitter is further configured to send, to the second base station, the transmit power information corresponding to the CSI-RS of the first cell and the configuration information corresponding to the CSI-RS of the first cell, wherein the first cell is determined by the PCI and the CSI-RS; and
the receiver is further configured to receive the normalized path loss from the at least one second cell to the first cell sent by the second base station, wherein the normalized path loss from the at least one second cell to the first cell is determined by the second base station according to at least the transmit power information corresponding to the CSI-RS of the first cell and the configuration information corresponding to the CSI-RS of the first cell.

10. The base station according to claim 9, wherein
the selecting, by the processor according to at least the first message, a cell of the at least one second cell to add to an uplink CoMP set of first UE served by a first cell specifically comprises:
controlling, by the processor, the transmitter to send, to the first UE, the configuration information corresponding to the CSI-RS of each of the at least one second cell; and
when the receiver further receives receive power information that is obtained through measurement by the first UE according to the configuration information and that is corresponding to the CSI-RS of the cell of the at least one second cell, selecting, according to at least the receive power information, the cell of the at least one second cell to add to the uplink CoMP set of the first UE, wherein the receiver is further configured to receive the receive power information that is obtained through measurement by the first UE according to the configuration information and that is corresponding to the CSI-RS of the cell of the at least one second cell.

11. A base station, comprising:
a receiver;
a memory; and
a processor, wherein:
the receiver is configured to receive a first message sent by a second base station, wherein the first message carries configuration information corresponding to a channel state information-reference signal (CSI-RS) of each of at least one second cell;
the memory is configured to store program code; and
the processor is configured to execute the code, wherein the code comprises: controlling, by the processor, the receiver to receive the first message; and selecting, by the processor according to at least the first message, a cell of the at least one second cell to add to an uplink coordinated multipoint transmission (CoMP) set of first user equipment (UE) served by a first cell,
wherein the at least one second cell is a cell of the second base station, and the cell of the at least one second cell is determined by a physical cell identifier PCI and the CSI-RS; the first cell is a cell of the first base station, wherein the base station further comprises a transmitter, configured to send, to the first UE, the configuration information corresponding to the CSI-RS of each of the at least one second cell; and
the selecting, by the processor according to at least the first message, a cell of the at least one second cell to add to an uplink CoMP set of first UE served by a first cell specifically comprises:
controlling the transmitter to send, to the first UE, the configuration information corresponding to the CSI-RS of each of the at least one second cell;
when the receiver further receives receive power information that is obtained through measurement by the first UE according to the configuration information and that is corresponding to the CSI-RS of the cell of the at least one second cell, and when the first message further carries transmit power information corresponding to the CSI-RS of each of the at least one second cell, determining a path loss from the first UE to the cell of the at least one second cell according to the transmit power information corresponding to the CSI-RS of each of the at least one second cell and the receive power information that is obtained through measurement by the first UE and that is corresponding to the CSI-RS of the cell of the at least one second cell, wherein the receiver is further configured to receive the receive power information that is obtained through measurement by the first UE according to the configuration information and that is corresponding to the CSI-RS of the cell of the at least one second cell; and selecting, according to at least the path loss from the first UE to the cell of the at least one second cell, the cell of the at least one second cell to add to the uplink CoMP set of the first UE.

12. The base station according to claim 11, wherein the selecting, by the processor according to at least the path loss from the first UE to the cell of the at least one second cell, the cell of the at least one second cell to add to the uplink CoMP set of the first UE specifically comprises:
controlling the transmitter to send, to the second base station, transmit power information corresponding to a CSI-RS of the first cell and configuration information corresponding to the CSI-RS of the first cell; and
when the receiver receives a normalized path loss from the at least one second cell to the first cell sent by the second base station, selecting, according to at least the path loss from the first UE to the cell of the at least one second cell and the normalized path loss from the at least one second cell to the first cell, the cell of the at least one second cell to add to the uplink CoMP set of the first UE, wherein:
the transmitter is further configured to send, to the second base station, the transmit power information corresponding to the CSI-RS of the first cell and the configuration information corresponding to the CSI-RS of the first cell, wherein the first cell is determined by the PCI and the CSI-RS; and
the receiver is further configured to receive the normalized path loss from the at least one second cell to the first cell sent by the second base station, wherein the normalized path loss from the at least one second cell to the first cell is determined by the second base station according to at least the transmit power information corresponding to the CSI-RS of the first cell and the configuration information corresponding to the CSI-RS of the first cell.

13. A base station, comprising:
a receiver;
a memory;
a processor, wherein:
the receiver is configured to receive a first message sent by a second base station, wherein the first message carries configuration information corresponding to a channel state information-reference signal (CSI-RS) of each of at least one second cell;
the memory is configured to store program code; and
the processor is configured to execute the code, wherein the code comprises: controlling, by the processor, the receiver to receive the first message; and selecting, by the processor according to at least the first message, a cell of the at least one second cell to add to an uplink coordinated multipoint transmission (CoMP) set of a first cell; and
a transmitter, configured to send, to multiple first user equipments UEs served by the first cell, the configuration information corresponding to the CSI-RS of each of the at least one second cell;
wherein the at least one second cell is a cell of the second base station, and the cell of the at least one second cell is determined by a physical cell identifier (PCI) and the CSI-RS; the first cell is a cell of the first base station, and wherein the selecting comprising:
controlling, by the processor, the transmitter to send, to the second base station, transmit power information corresponding to a CSI-RS of the first cell and configuration information corresponding to the CSI-RS of the first cell; and
when the receiver further receives a normalized path loss from the at least one second cell to the first cell sent by the second base station, selecting, according to the normalized path loss from the first cell to the cell of the at least one second cell and the normalized path loss from the at least one second cell to the first cell, the cell of the at least one second cell to add to the uplink CoMP set of the first cell, wherein:
the transmitter is further configured to send, to the second base station, the transmit power information corresponding to the CSI-RS of the first cell and the configuration information corresponding to the CSI-RS of the first cell, wherein the first cell is determined by the PCI and the CSI-RS; and
the receiver is further configured to receive the normalized path loss from the at least one second cell to the first cell sent by the second base station, wherein the normalized path loss from the at least one second cell to the first cell is determined by the second base station according to at least the transmit power information corresponding to the CSI-RS of the first cell and the configuration information corresponding to the CSI-RS of the first cell.

14. The base station according to claim 13, wherein the selecting, by the processor according to at least the first message, a cell of the at least one second cell to add to an uplink CoMP set of a first cell specifically comprises:
controlling the transmitter to send, to the multiple first user equipments UE served by the first cell, the configuration information corresponding to the CSI-RS of each of the at least one second cell; and
when the receiver further receives receive power information that is obtained through measurement by the multiple first UEs according to the configuration information and that is corresponding to the CSI-RS of the cell of the at least one second cell, determining average receive power from the first cell to the cell of the at least one second cell according to at least the receive power information, and selecting, according to the average receive power, the cell of the at least one second cell to add to the uplink CoMP set of the first cell, wherein:
the receiver is further configured to receive the receive power information that is obtained through measurement by the multiple first UEs according to the configuration information and that is corresponding to the CSI-RS of the cell of the at least one second cell.

15. A base station, comprising a receiver, a memory, and a processor, wherein:
the receiver is configured to receive a first message sent by a second base station, wherein the first message carries configuration information corresponding to a channel state information-reference signal (CSI-RS) of each of at least one second cell;
the memory is configured to store program code; and
the processor is configured to execute the code, wherein the code comprises: controlling, by the processor, the receiver to receive the first message; and selecting, by the processor according to at least the first message, a cell of the at least one second cell to add to an uplink coordinated multipoint transmission (CoMP) set of a first cell;
wherein the at least one second cell is a cell of the second base station, and the cell of the at least one second cell is determined by a physical cell identifier (PCI) and the CSI-RS; the first cell is a cell of the first base station, wherein the base station further comprises a transmitter, configured to send, to multiple first user equipments (UEs) served by the first cell, the configuration information corresponding to the CSI-RS of each of the at least one second cell; and the selecting, by the processor according to at least the first message, a cell of the at least one second cell to add to an uplink CoMP set of a first cell specifically comprises:

controlling the transmitter to send, to the multiple first UEs, the configuration information corresponding to the CSI-RS of each of the at least one second cell;

when the receiver further receives receive power information that is obtained through measurement by the multiple first UEs according to the configuration information and that is corresponding to the CSI-RS of the cell of the at least one second cell, and when the first message further carries transmit power information corresponding to the CSI-RS of each of the at least one second cell, determining a normalized path loss from the first cell to the cell of the at least one second cell according to the transmit power information corresponding to the CSI-RS of each of the at least one second cell and the receive power information that is obtained through measurement by the multiple first UEs and that is corresponding to the CSI-RS of the cell of the at least one second cell; and selecting, according to at least the normalized path loss from the first cell to the cell of the at least one second cell, the cell of the at least one second cell to add to the uplink CoMP set of the first cell, wherein:

the receiver is further configured to receive the receive power information that is obtained through measurement by the multiple first UEs according to the configuration information and that is corresponding to the CSI-RS of the cell of the at least one second cell.

16. The base station according to claim 15, wherein the selecting, by the processor according to at least the normalized path loss from the first cell to the cell of the at least one second cell, the cell of the at least one second cell to add to the uplink CoMP set of the first cell specifically comprises:

controlling, by the processor, the transmitter to send, to the second base station, transmit power information corresponding to a CSI-RS of the first cell and configuration information corresponding to the CSI-RS of the first cell; and when the receiver further receives a normalized path loss from the at least one second cell to the first cell sent by the second base station, selecting, according to the normalized path loss from the first cell to the cell of the at least one second cell and the normalized path loss from the at least one second cell to the first cell, the cell of the at least one second cell to add to the uplink CoMP set of the first cell, wherein:

the transmitter is further configured to send, to the second base station, the transmit power information corresponding to the CSI-RS of the first cell and the configuration information corresponding to the CSI-RS of the first cell, wherein the first cell is determined by the PCI and the CSI-RS; and the receiver is further configured to receive the normalized path loss from the at least one second cell to the first cell sent by the second base station, wherein the normalized path loss from the at least one second cell to the first cell is determined by the second base station according to at least the transmit power information corresponding to the CSI-RS of the first cell and the configuration information corresponding to the CSI-RS of the first cell.

* * * * *